(12) United States Patent
Boling et al.

(10) Patent No.: US 12,242,575 B2
(45) Date of Patent: *Mar. 4, 2025

(54) SYSTEMS AND METHODS FOR POLICY LINKING AND/OR LOADING FOR SECURE INITIALIZATION

(71) Applicant: Dover Microsystems, Inc., Wayland, MA (US)

(72) Inventors: Eli Boling, Manchester, MA (US); Steven Milburn, Cranston, RI (US); Gregory T. Sullivan, Rockport, MA (US); Andrew Sutherland, Portland, OR (US)

(73) Assignee: Dover Microsystems, Inc., Wayland, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/348,388

(22) Filed: Jul. 7, 2023

(65) Prior Publication Data

US 2024/0045932 A1 Feb. 8, 2024

Related U.S. Application Data

(63) Continuation of application No. 17/711,092, filed on Apr. 1, 2022, now Pat. No. 11,748,457, which is a
(Continued)

(51) Int. Cl.
*G06F 21/12* (2013.01)
*G06F 8/41* (2018.01)
(Continued)

(52) U.S. Cl.
CPC ............. *G06F 21/125* (2013.01); *G06F 8/41* (2013.01); *G06F 8/447* (2013.01); *G06F 8/52* (2013.01);
(Continued)

(58) Field of Classification Search
None
See application file for complete search history.

(56) References Cited

U.S. PATENT DOCUMENTS

| 5,201,056 A | 4/1993 | Daniel et al. |
| 5,377,336 A | 12/1994 | Eickemeyer et al. |

(Continued)

FOREIGN PATENT DOCUMENTS

| CN | 101558388 A | 10/2009 |
| CN | 102160033 A | 8/2011 |

(Continued)

OTHER PUBLICATIONS

Nickolai Zeldovich "Hardware Enforcement of Application Security Policies Using Tagged Memory", USENIX, Nov. 14, 2008 (Nov. 14, 2908). pp. 1-16 (Year: 2008).*

(Continued)

*Primary Examiner* — Sanchit K Sarker
(74) *Attorney, Agent, or Firm* — Wolf, Greenfield & Sacks, P.C.

(57) ABSTRACT

A system including at least one processor programmed to identify, based on a policy to be enforced, one or more metadata symbols corresponding to an entity name; identify, from a target description describing a target system, an entity description matching the entity name, wherein the entity description describes an entity of the target system; and apply a metadata label to the entity of the target system, wherein the metadata label is based on the one or more metadata symbols corresponding to the entity name, as identified based on the policy.

23 Claims, 11 Drawing Sheets

Related U.S. Application Data continuation of application No. 16/966,616, filed as application No. PCT/US2019/016272 on Feb. 1, 2019, now abandoned.

(60) Provisional application No. 62/635,289, filed on Feb. 26, 2018, provisional application No. 62/625,822, filed on Feb. 2, 2018.

(51) Int. Cl.

| | | |
|---|---|---|
| *G06F 8/52* | (2018.01) | |
| *G06F 8/54* | (2018.01) | |
| *G06F 9/445* | (2018.01) | |
| *G06F 21/51* | (2013.01) | |
| *G06F 21/52* | (2013.01) | |
| *G06F 21/54* | (2013.01) | |
| *H04L 9/32* | (2006.01) | |

(52) U.S. Cl.
CPC ............ *G06F 8/54* (2013.01); *G06F 9/44505* (2013.01); *G06F 21/121* (2013.01); *G06F 21/51* (2013.01); *G06F 21/52* (2013.01); *G06F 21/54* (2013.01); *H04L 9/3247* (2013.01)

(56) References Cited

U.S. PATENT DOCUMENTS

| | | | |
|---|---|---|---|
| 5,488,730 A | 1/1996 | Brown, III et al. | |
| 5,521,910 A | 5/1996 | Matthews | |
| 5,559,952 A | 9/1996 | Fujimoto | |
| 5,655,100 A | 8/1997 | Ebrahim et al. | |
| 5,664,197 A | 9/1997 | Kardach et al. | |
| 5,664,223 A | 9/1997 | Bender et al. | |
| 5,684,977 A | 11/1997 | Van Loo et al. | |
| 5,764,946 A | 6/1998 | Tran et al. | |
| 5,778,423 A | 7/1998 | Sites et al. | |
| 5,848,433 A | 12/1998 | Tran et al. | |
| 5,890,008 A | 3/1999 | Panwar et al. | |
| 5,941,981 A | 8/1999 | Tran | |
| 6,014,734 A | 1/2000 | Tran et al. | |
| 6,035,374 A | 3/2000 | Panwar et al. | |
| 6,058,466 A | 5/2000 | Panwar et al. | |
| 6,240,502 B1 | 5/2001 | Panwar et al. | |
| 6,269,436 B1 | 7/2001 | Tran et al. | |
| 6,298,432 B1 | 10/2001 | Goto | |
| 6,321,297 B1 | 11/2001 | Shamanna et al. | |
| 6,324,599 B1 | 11/2001 | Zhou et al. | |
| 6,351,784 B1 | 2/2002 | Neal et al. | |
| 6,438,673 B1 | 8/2002 | Jourdan et al. | |
| 6,449,714 B1 | 9/2002 | Sinharoy | |
| 6,549,903 B1 | 4/2003 | Babaian et al. | |
| 6,549,959 B1 | 4/2003 | Yates et al. | |
| 6,622,182 B1 | 9/2003 | Miller et al. | |
| 6,625,146 B1 | 9/2003 | Merchant et al. | |
| 6,636,523 B1 | 10/2003 | Lau et al. | |
| 6,748,589 B1 | 6/2004 | Johnson et al. | |
| 6,922,740 B2 | 7/2005 | Kondratiev et al. | |
| 6,976,147 B1 | 12/2005 | Isaac et al. | |
| 7,047,394 B1 | 5/2006 | Van Dyke et al. | |
| 7,058,918 B2 | 6/2006 | Abramovici et al. | |
| 7,095,783 B1 | 8/2006 | Sotheran et al. | |
| 7,137,086 B2 | 11/2006 | Abramovici | |
| 7,146,548 B1 | 12/2006 | Abramovici | |
| 7,213,247 B1 | 5/2007 | Wilner et al. | |
| 7,263,572 B2 | 8/2007 | Hiji | |
| 7,296,201 B2 | 11/2007 | Abramovici | |
| 7,301,541 B2 | 11/2007 | Hansen et al. | |
| 7,305,635 B1 | 12/2007 | Abramovici et al. | |
| 7,313,820 B2 | 12/2007 | Kilroy | |
| 7,340,469 B1 | 3/2008 | Alghathbar et al. | |
| 7,348,796 B2 | 3/2008 | Crouch et al. | |
| 7,426,705 B1 | 9/2008 | Kolaric | |
| 7,430,650 B1 | 9/2008 | Ross | |
| 7,434,002 B1 | 10/2008 | Zedlewski et al. | |
| 7,467,414 B2 | 12/2008 | Schlesinger | |
| 7,487,264 B2 | 2/2009 | Pandya | |
| 7,493,247 B2 | 2/2009 | Memmi | |
| 7,493,434 B1 | 2/2009 | Abramovici | |
| 7,574,536 B2 | 8/2009 | Johnsen et al. | |
| 7,580,914 B2 | 8/2009 | Wang et al. | |
| 7,581,064 B1 | 8/2009 | Zedlewski et al. | |
| 7,631,107 B2 | 12/2009 | Pandya | |
| 7,688,838 B1 | 3/2010 | Aloni et al. | |
| 7,698,402 B2 | 4/2010 | Santos et al. | |
| 7,813,342 B2 | 10/2010 | Gadelrab | |
| 7,886,148 B2 | 2/2011 | Kiriansky et al. | |
| 8,074,052 B2 | 12/2011 | Iadonato et al. | |
| 8,121,828 B2 | 2/2012 | Yates, Jr. et al. | |
| 8,127,121 B2 | 2/2012 | Yates, Jr. et al. | |
| 8,131,663 B1 | 3/2012 | Taylor | |
| 8,131,762 B2 | 3/2012 | Smetters et al. | |
| 8,166,404 B2 | 4/2012 | Grinstein | |
| 8,181,219 B2 | 5/2012 | Golan et al. | |
| 8,271,447 B1 | 9/2012 | Natanzon et al. | |
| 8,326,774 B2 | 12/2012 | Candelore | |
| 8,335,754 B2 | 12/2012 | Dawson et al. | |
| 8,346,760 B2 | 1/2013 | Wang et al. | |
| 8,364,910 B2 | 1/2013 | Wilkerson et al. | |
| 8,380,933 B2 | 2/2013 | Uchiyama | |
| 8,423,720 B2 | 4/2013 | Döring | |
| 8,516,193 B1 | 8/2013 | Clinton et al. | |
| 8,543,606 B2 | 9/2013 | Pulfer et al. | |
| 8,572,410 B1 | 10/2013 | Tkacik et al. | |
| 8,677,457 B2 | 3/2014 | Fullerton | |
| 8,701,200 B2 | 4/2014 | Naldurg et al. | |
| 8,738,860 B1 | 5/2014 | Griffin et al. | |
| 8,756,185 B2 | 6/2014 | Dawson et al. | |
| 8,788,792 B2 | 7/2014 | Yates, Jr. et al. | |
| 8,826,391 B2 | 9/2014 | Tkacik et al. | |
| 8,843,734 B2 | 9/2014 | Lim | |
| 8,904,477 B2 | 9/2014 | Barton et al. | |
| 8,874,850 B1 | 10/2014 | Goodson et al. | |
| 8,875,170 B1 | 10/2014 | Daniel | |
| 8,887,230 B2 | 11/2014 | Barton et al. | |
| 8,938,783 B2 | 1/2015 | Becker et al. | |
| 9,026,733 B1 | 5/2015 | Clinton et al. | |
| 9,047,178 B2 | 6/2015 | Talagala et al. | |
| 9,087,200 B2 | 7/2015 | McKeen et al. | |
| 9,165,078 B2 | 10/2015 | Bester et al. | |
| 9,208,082 B1 | 12/2015 | Cheriton et al. | |
| 9,219,752 B2 | 12/2015 | Balinksy et al. | |
| 9,251,052 B2 | 2/2016 | Talagala et al. | |
| 9,311,093 B2 | 4/2016 | Gschwind et al. | |
| 9,317,708 B2 | 4/2016 | Lee et al. | |
| 9,323,684 B2 | 4/2016 | Koker et al. | |
| 9,467,474 B2 | 10/2016 | Barton et al. | |
| 9,507,589 B2 | 11/2016 | Rao et al. | |
| 9,507,598 B1 | 11/2016 | Bonnano et al. | |
| 9,513,884 B2 | 12/2016 | Bates et al. | |
| 9,525,606 B1 | 12/2016 | Staggs et al. | |
| 9,571,509 B1 | 2/2017 | Satish et al. | |
| 9,576,147 B1 | 2/2017 | McClintock et al. | |
| 9,665,603 B2 | 5/2017 | Bester et al. | |
| 9,680,736 B2 | 6/2017 | Kamboh | |
| 9,680,738 B2 | 6/2017 | Jackson et al. | |
| 9,703,956 B1 | 7/2017 | Watson et al. | |
| 9,736,185 B1 | 8/2017 | Belamaric et al. | |
| 9,785,440 B2 | 10/2017 | DeHon | |
| 9,792,472 B1 | 10/2017 | Robshaw et al. | |
| 9,906,557 B2 | 2/2018 | Hsiung et al. | |
| 9,953,095 B1 | 4/2018 | Scott et al. | |
| 10,073,977 B2 | 9/2018 | Pappachan et al. | |
| 10,078,763 B2 | 9/2018 | Chiricescu et al. | |
| 10,114,958 B2 | 10/2018 | Sell | |
| 10,133,866 B1 | 11/2018 | Kumar et al. | |
| 10,152,330 B2 | 12/2018 | Chiricescu et al. | |
| 10,235,176 B2 | 3/2019 | DeHon et al. | |
| 10,261,794 B2 | 4/2019 | DeHon | |
| 10,424,043 B1 | 9/2019 | Koston et al. | |
| 10,503,904 B1 | 12/2019 | Singh et al. | |
| 10,521,230 B2 | 12/2019 | DeHon | |
| 10,545,760 B2 | 1/2020 | DeHon | |

(56) References Cited

U.S. PATENT DOCUMENTS

| | | | |
|---|---|---|---|
| 10,642,616 B2 | 5/2020 | DeHon et al. |
| 10,642,753 B1 | 5/2020 | Steinberg |
| 10,719,630 B2 | 7/2020 | Chiricescu et al. |
| 10,725,778 B2 | 7/2020 | DeHon et al. |
| 10,754,650 B2 | 8/2020 | DeHon et al. |
| 10,936,713 B2 | 3/2021 | DeHon et al. |
| 11,150,910 B2 | 10/2021 | Milburn et al. |
| 11,182,162 B2 | 11/2021 | DeHon et al. |
| 11,340,902 B2 | 5/2022 | DeHon |
| 11,417,109 B1 | 8/2022 | Theimer et al. |
| 11,507,373 B2 | 11/2022 | Dehon et al. |
| 11,556,664 B2 | 1/2023 | Levy et al. |
| 11,748,457 B2 | 9/2023 | Boling et al. |
| 11,977,613 B2 | 5/2024 | Casinghino et al. |
| 2002/0083298 A1 | 6/2002 | Cook et al. |
| 2002/0087795 A1 | 7/2002 | Hum et al. |
| 2002/0124156 A1 | 9/2002 | Yoaz et al. |
| 2003/0014466 A1 | 1/2003 | Berger et al. |
| 2003/0023783 A1 | 1/2003 | Arimilli et al. |
| 2003/0058889 A1 | 3/2003 | Lansing et al. |
| 2003/0120892 A1 | 6/2003 | Hum et al. |
| 2003/0145235 A1 | 7/2003 | Choo |
| 2003/0149895 A1 | 8/2003 | Choo et al. |
| 2003/0172109 A1 | 9/2003 | Dalton et al. |
| 2003/0196108 A1 | 10/2003 | Kung |
| 2004/0015845 A1 | 1/2004 | Hickman |
| 2004/0117599 A1 | 6/2004 | Mittal et al. |
| 2004/0133777 A1 | 7/2004 | Kiriansky et al. |
| 2004/0236876 A1 | 11/2004 | Kondratiev et al. |
| 2004/0255267 A1 | 12/2004 | Meijer |
| 2005/0055565 A1 | 3/2005 | Fournet et al. |
| 2005/0108518 A1 | 5/2005 | Pandya |
| 2005/0149521 A1 | 7/2005 | Wang et al. |
| 2005/0149719 A1 | 7/2005 | Kilroy |
| 2005/0154838 A1 | 7/2005 | DeWitt et al. |
| 2005/0182667 A1 * | 8/2005 | Metzger .............. G06Q 40/08 705/4 |
| 2006/0004548 A1 | 1/2006 | Santos et al. |
| 2006/0059567 A1 | 3/2006 | Bird et al. |
| 2006/0080489 A1 | 4/2006 | Hiji |
| 2006/0080553 A1 | 4/2006 | Hall |
| 2006/0090084 A1 | 4/2006 | Buer |
| 2006/0112261 A1 | 5/2006 | Yourst et al. |
| 2006/0143689 A1 | 6/2006 | Yu et al. |
| 2006/0242332 A1 | 10/2006 | Johnsen et al. |
| 2006/0277392 A1 | 12/2006 | Bittner, Jr. |
| 2007/0006294 A1 | 1/2007 | Hunter |
| 2007/0050586 A1 | 3/2007 | Shin et al. |
| 2007/0226365 A1 | 9/2007 | Hildreth et al. |
| 2007/0239861 A1 * | 10/2007 | Reeves .............. G06F 8/61 709/222 |
| 2007/0261033 A1 | 11/2007 | Chen et al. |
| 2007/0279264 A1 | 12/2007 | Nakagawa |
| 2008/0010233 A1 | 1/2008 | Sack et al. |
| 2008/0016547 A1 | 1/2008 | Anderson et al. |
| 2008/0028196 A1 | 1/2008 | Kailas |
| 2008/0052488 A1 | 2/2008 | Fritz et al. |
| 2008/0066160 A1 | 3/2008 | Becker et al. |
| 2008/0083298 A1 | 4/2008 | Lin |
| 2008/0126841 A1 | 5/2008 | Benhanokh et al. |
| 2008/0140737 A1 | 6/2008 | Garst et al. |
| 2008/0168529 A1 | 7/2008 | Anderson et al. |
| 2008/0216073 A1 | 9/2008 | Yates et al. |
| 2008/0216102 A1 | 9/2008 | Quinn |
| 2008/0222397 A1 | 9/2008 | Wilkerson et al. |
| 2008/0240111 A1 | 10/2008 | Gadelrab |
| 2008/0244232 A1 | 10/2008 | Sherman et al. |
| 2008/0248599 A1 | 10/2008 | Jaiswal et al. |
| 2008/0250216 A1 | 10/2008 | Kershaw et al. |
| 2008/0282040 A1 | 11/2008 | Doring |
| 2008/0282093 A1 | 11/2008 | Hatakeyama |
| 2008/0288941 A1 | 11/2008 | Adams et al. |
| 2008/0301256 A1 | 12/2008 | McWilliams et al. |
| 2008/0301471 A1 | 12/2008 | Demarest et al. |
| 2008/0320235 A1 | 12/2008 | Beckmann et al. |
| 2009/0006519 A1 | 1/2009 | Nandan et al. |
| 2009/0063951 A1 | 3/2009 | Rjaibi et al. |
| 2009/0097815 A1 | 4/2009 | Lahr et al. |
| 2009/0113110 A1 | 4/2009 | Chen et al. |
| 2009/0113132 A1 | 4/2009 | Cain, III et al. |
| 2009/0113135 A1 | 4/2009 | Cain et al. |
| 2009/0144388 A1 | 6/2009 | Gross et al. |
| 2009/0164705 A1 | 6/2009 | Gorobets |
| 2009/0164766 A1 | 6/2009 | Suggs et al. |
| 2009/0165078 A1 * | 6/2009 | Samudrala .............. G06F 21/604 726/1 |
| 2009/0178102 A1 | 7/2009 | Alghathbar et al. |
| 2009/0204785 A1 | 8/2009 | Yates, Jr. et al. |
| 2009/0241097 A1 | 9/2009 | Wang et al. |
| 2009/0254543 A1 | 10/2009 | Ber et al. |
| 2009/0254572 A1 | 10/2009 | Redlich et al. |
| 2010/0011209 A1 | 1/2010 | Kiriansky et al. |
| 2010/0011446 A1 | 1/2010 | Klucher et al. |
| 2010/0022869 A1 | 1/2010 | Kimura |
| 2010/0049974 A1 | 2/2010 | Winjum et al. |
| 2010/0138613 A1 | 6/2010 | Parker |
| 2010/0154026 A1 | 6/2010 | Chatterjee et al. |
| 2010/0169382 A1 | 7/2010 | Sheaffer et al. |
| 2010/0191922 A1 | 7/2010 | Dickey et al. |
| 2010/0228693 A1 | 9/2010 | Dawson et al. |
| 2010/0235580 A1 | 9/2010 | Bouvier |
| 2010/0250729 A1 | 9/2010 | Morris |
| 2010/0332716 A1 | 12/2010 | Sheaffer et al. |
| 2011/0016295 A1 | 1/2011 | Catherwood et al. |
| 2011/0078389 A1 | 3/2011 | Patel et al. |
| 2011/0099336 A1 | 4/2011 | Yasufuku et al. |
| 2011/0126265 A1 | 5/2011 | Fullerton |
| 2011/0161623 A1 | 6/2011 | Eichenberger et al. |
| 2011/0219424 A1 | 9/2011 | Panasyuk et al. |
| 2011/0238805 A1 | 9/2011 | Signori |
| 2012/0036507 A1 | 2/2012 | Jonnala et al. |
| 2012/0079458 A1 | 3/2012 | Williams et al. |
| 2012/0117610 A1 | 5/2012 | Pandya |
| 2012/0144167 A1 | 6/2012 | Yates, Jr. et al. |
| 2012/0151184 A1 | 6/2012 | Wilkerson et al. |
| 2012/0180031 A1 | 7/2012 | Eichenberger et al. |
| 2012/0203970 A1 | 8/2012 | Biran et al. |
| 2012/0210066 A1 | 8/2012 | Joshi et al. |
| 2012/0210068 A1 | 8/2012 | Joshi et al. |
| 2012/0233212 A1 | 9/2012 | Newton et al. |
| 2012/0236756 A1 | 9/2012 | Bennett et al. |
| 2012/0297057 A1 | 11/2012 | Ghosh et al. |
| 2013/0006993 A1 | 1/2013 | Kobayashi |
| 2013/0010779 A1 | 1/2013 | Fischer et al. |
| 2013/0016075 A1 | 1/2013 | Kim et al. |
| 2013/0047142 A1 | 2/2013 | Bates et al. |
| 2013/0067593 A1 | 3/2013 | Candelore |
| 2013/0081134 A1 | 3/2013 | Glew et al. |
| 2013/0097369 A1 | 4/2013 | Talagala et al. |
| 2013/0097421 A1 | 4/2013 | Lim |
| 2013/0097667 A1 | 4/2013 | Pulfer et al. |
| 2013/0138892 A1 | 5/2013 | Loh et al. |
| 2013/0159726 A1 | 6/2013 | McKeen et al. |
| 2013/0160075 A1 | 6/2013 | Schlesinger et al. |
| 2013/0160775 A1 | 6/2013 | Curnow |
| 2013/0185475 A1 | 7/2013 | Talagala et al. |
| 2013/0185488 A1 | 7/2013 | Talagala et al. |
| 2013/0212321 A1 | 8/2013 | Talagala et al. |
| 2013/0227218 A1 | 8/2013 | Chang et al. |
| 2013/0254838 A1 | 9/2013 | Ahuja et al. |
| 2013/0275656 A1 | 10/2013 | Talagala et al. |
| 2013/0283017 A1 | 10/2013 | Wilkerson et al. |
| 2013/0290607 A1 | 10/2013 | Chang et al. |
| 2013/0326117 A1 | 12/2013 | Aune |
| 2014/0006804 A1 | 1/2014 | Tkacik et al. |
| 2014/0019385 A1 | 1/2014 | Dawson et al. |
| 2014/0047181 A1 | 2/2014 | Peterson et al. |
| 2014/0047183 A1 | 2/2014 | Chawla et al. |
| 2014/0101396 A1 | 4/2014 | Bonanno et al. |
| 2014/0140342 A1 | 5/2014 | Narad |
| 2014/0173211 A1 | 6/2014 | Loh et al. |
| 2014/0223445 A1 | 8/2014 | Beckmann et al. |
| 2014/0280248 A1 | 9/2014 | Bester et al. |
| 2014/0281192 A1 | 9/2014 | Gilda et al. |

(56) References Cited

U.S. PATENT DOCUMENTS

| | | |
|---|---|---|
| 2014/0282832 A1 | 9/2014 | Chanoch et al. |
| 2014/0283040 A1 | 9/2014 | Wilkerson et al. |
| 2014/0283107 A1 | 9/2014 | Walton et al. |
| 2015/0012689 A1 | 1/2015 | Atkisson et al. |
| 2015/0046658 A1 | 2/2015 | Wilson |
| 2015/0058997 A1 | 2/2015 | Lee et al. |
| 2015/0089186 A1 | 3/2015 | Kim et al. |
| 2015/0092778 A1 | 4/2015 | Jackson et al. |
| 2015/0120699 A1 | 4/2015 | Faerber et al. |
| 2015/0149673 A1 | 5/2015 | Balkan et al. |
| 2015/0205535 A1 | 7/2015 | Joshi et al. |
| 2015/0220453 A1 | 8/2015 | Heisswolf et al. |
| 2015/0249668 A1 | 9/2015 | Reddy et al. |
| 2015/0278311 A1 | 10/2015 | Isherwood et al. |
| 2015/0339062 A1 | 11/2015 | Toyoda et al. |
| 2015/0339329 A1 | 11/2015 | Bester et al. |
| 2015/0378780 A1 | 12/2015 | Busaba et al. |
| 2015/0381660 A1 | 12/2015 | Hsiung et al. |
| 2016/0048551 A1 | 2/2016 | Baldwin et al. |
| 2016/0062803 A1 | 3/2016 | Beckmann et al. |
| 2016/0077816 A1 | 3/2016 | Eilam et al. |
| 2016/0092702 A1 | 3/2016 | Durham et al. |
| 2016/0132536 A1 | 5/2016 | Lee |
| 2016/0140363 A1 | 5/2016 | Chiricescu et al. |
| 2016/0154833 A1 | 6/2016 | Isherwood, Jr. et al. |
| 2016/0170769 A1 | 6/2016 | LeMay |
| 2016/0182408 A1 | 6/2016 | Jani et al. |
| 2016/0188891 A1 | 6/2016 | Schlesinger et al. |
| 2016/0196432 A1 | 7/2016 | Main et al. |
| 2016/0239223 A9 | 8/2016 | Joshi et al. |
| 2016/0274810 A1 | 9/2016 | Godard et al. |
| 2016/0335187 A1 | 11/2016 | Greenspan et al. |
| 2016/0350019 A1 | 12/2016 | Koufaty et al. |
| 2016/0350230 A1 | 12/2016 | Murphy |
| 2016/0366102 A1 | 12/2016 | Smith |
| 2016/0371496 A1 | 12/2016 | Sell |
| 2017/0024568 A1 | 1/2017 | Pappachan et al. |
| 2017/0031708 A1 | 2/2017 | Chen et al. |
| 2017/0048249 A1 | 2/2017 | Berrangé |
| 2017/0061160 A1 | 3/2017 | Simonov et al. |
| 2017/0083338 A1 | 3/2017 | Burger et al. |
| 2017/0091107 A1 | 3/2017 | Peterson et al. |
| 2017/0126687 A1 | 5/2017 | Martinelli |
| 2017/0126738 A1 | 5/2017 | Wilkerson et al. |
| 2017/0177367 A1 | 6/2017 | DeHon |
| 2017/0177368 A1 | 6/2017 | DeHon et al. |
| 2017/0192986 A1 | 7/2017 | Isherwood et al. |
| 2017/0220806 A1 | 8/2017 | Munoz et al. |
| 2017/0235840 A1 | 8/2017 | Bester et al. |
| 2017/0286119 A1 | 10/2017 | Al Sheikh et al. |
| 2017/0286151 A1 | 10/2017 | Landers et al. |
| 2017/0293563 A1 | 10/2017 | DeHon et al. |
| 2017/0308480 A1 | 10/2017 | Wilson |
| 2017/0329961 A1 | 11/2017 | Shanbhogue et al. |
| 2018/0011708 A1 | 1/2018 | DeHon |
| 2018/0046579 A1 | 2/2018 | Greenspan et al. |
| 2018/0082055 A1 | 3/2018 | Fleming et al. |
| 2018/0121650 A1 | 5/2018 | Brown |
| 2018/0143890 A1* | 5/2018 | Ogawa ............... G06F 11/3409 |
| 2018/0189062 A1 | 7/2018 | Baghsorkhi et al. |
| 2018/0276085 A1 | 9/2018 | Mitkar et al. |
| 2018/0302443 A1 | 10/2018 | Weiss et al. |
| 2018/0336031 A1 | 11/2018 | DeHon et al. |
| 2018/0336032 A1 | 11/2018 | DeHon et al. |
| 2018/0336033 A1 | 11/2018 | DeHon |
| 2018/0341490 A1 | 11/2018 | DeHon |
| 2019/0034665 A1 | 1/2019 | Chiricescu et al. |
| 2019/0141059 A1 | 5/2019 | Shimizu et al. |
| 2019/0155606 A1 | 5/2019 | Rotem et al. |
| 2019/0171457 A1 | 6/2019 | DeHon et al. |
| 2019/0205244 A1 | 7/2019 | Smith |
| 2019/0213322 A1 | 7/2019 | DeHon et al. |
| 2019/0236272 A1 | 8/2019 | Piatt |
| 2019/0243655 A1 | 8/2019 | Milburn et al. |
| 2019/0243768 A1 | 8/2019 | Doshi et al. |
| 2019/0354675 A1 | 11/2019 | Gan et al. |
| 2019/0384604 A1 | 12/2019 | DeHon et al. |
| 2019/0392146 A1 | 12/2019 | Gezalov et al. |
| 2019/0392147 A1 | 12/2019 | Gezalov et al. |
| 2020/0089500 A1 | 3/2020 | DeHon |
| 2020/0125502 A1 | 4/2020 | Durham et al. |
| 2020/0201576 A1 | 6/2020 | Yudanov et al. |
| 2020/0387374 A1 | 12/2020 | DeHon |
| 2020/0387384 A1 | 12/2020 | Huang |
| 2021/0004231 A1 | 1/2021 | DeHon |
| 2021/0026934 A1 | 1/2021 | Boling et al. |
| 2021/0042100 A1 | 2/2021 | Boling et al. |
| 2021/0055954 A1 | 2/2021 | Milburn et al. |
| 2021/0073375 A1 | 3/2021 | Milburn et al. |
| 2021/0075797 A1 | 3/2021 | Gan et al. |
| 2021/0255890 A1 | 8/2021 | Milburn et al. |
| 2021/0406028 A1 | 12/2021 | Boling et al. |
| 2021/0406137 A1 | 12/2021 | Sutherland et al. |
| 2022/0012329 A1 | 1/2022 | Boling et al. |
| 2022/0043654 A1 | 2/2022 | DeHon et al. |
| 2022/0050904 A1 | 2/2022 | Sullivan et al. |
| 2022/0092173 A1 | 3/2022 | Sutherland et al. |
| 2022/0129343 A1 | 4/2022 | Milburn et al. |
| 2022/0198014 A1 | 6/2022 | Boling et al. |
| 2022/0300583 A1 | 9/2022 | Boling et al. |
| 2022/0309134 A1 | 9/2022 | Boling et al. |
| 2022/0374415 A1 | 11/2022 | Boling et al. |
| 2022/0398312 A1 | 12/2022 | Sutherland et al. |

FOREIGN PATENT DOCUMENTS

| | | |
|---|---|---|
| CN | 103282889 A | 9/2013 |
| CN | 104657500 A | 5/2015 |
| CN | 104794067 A | 7/2015 |
| GB | 2519608 A | 4/2015 |
| JP | 2013-242633 A | 12/2013 |
| TW | 201333722 A | 8/2013 |
| TW | 201729068 A | 8/2017 |
| TW | 201737675 A | 10/2017 |
| WO | WO 92/03779 A1 | 3/1992 |
| WO | WO 2010/028316 A1 | 3/2010 |
| WO | WO 2015/047295 A1 | 4/2015 |
| WO | WO 2015/183481 A1 | 12/2015 |
| WO | WO 2017/106101 A2 | 6/2017 |
| WO | WO 2017/106103 A1 | 6/2017 |
| WO | WO 2017/221373 A1 | 12/2017 |
| WO | WO 2019/152772 A1 | 8/2019 |
| WO | WO 2019/152792 A1 | 8/2019 |
| WO | WO 2019/152795 A1 | 8/2019 |
| WO | WO 2019/152805 A1 | 8/2019 |
| WO | WO 2019/152822 A1 | 8/2019 |
| WO | WO 2019/213061 A1 | 11/2019 |
| WO | WO 2020/097177 A1 | 5/2020 |
| WO | WO 2020/097179 A1 | 5/2020 |
| WO | WO 2020/102064 A1 | 5/2020 |
| WO | WO 2020/132012 A1 | 6/2020 |
| WO | WO 2020/150351 A1 | 7/2020 |
| WO | WO 2021/076871 A1 | 4/2021 |
| WO | WO 2021/092138 A1 | 5/2021 |

OTHER PUBLICATIONS

International Search Report and Written Opinion for International Application No. PCT/US2019/016272 mailed Apr. 8, 2019.
International Preliminary Report on Patentability for International Application No. PCT/US2019/016272 mailed Aug. 13, 2020.
International Search Report and Written Opinion for International Application No. PCT/US2019/016276 mailed Apr. 26, 2019.
International Preliminary Report on Patentability for International Application No. PCT/US2019/016276 mailed Aug. 13, 2020.
International Search Report and Written Opinion for International Application No. PCT/US2019/029880 mailed Aug. 8, 2019.
International Preliminary Report on Patentability for International Application No. PCT/US2019/029880 mailed Nov. 12, 2020.
International Search Report and Written Opinion for International Application No. PCT/US2019/016317 mailed Apr. 16, 2019.
International Preliminary Report on Patentability for International Application No. PCT/US2019/016317 mailed Aug. 13, 2020.

(56) References Cited

OTHER PUBLICATIONS

International Search Report and Written Opinion for International Application No. PCT/US2020/059057 mailed Feb. 8, 2021.
International Preliminary Report on Patentability for International Application No. PCT/US2020/059057, mailed May 19, 2022.
International Search Report and Written Opinion for International Application No. PCT/US2016/066188 mailed Jul. 13, 2017.
International Search Report and Written Opinion for International Application No. PCT/US2016/066194 mailed Apr. 7, 2017.
International Search Report and Written Opinion for International Application No. PCT/US2019/016242 mailed Mar. 29, 2019.
International Search Report and Written Opinion for International Application No. PCT/US2019/060030 mailed Mar. 19, 2020.
International Search Report and Written Opinion for International Application No. PCT/US2019/060698 mailed Feb. 3, 2020.
International Search Report and Written Opinion for International Application No. PCT/US2019/067084 mailed Mar. 19, 2020.
Invitation to Pay Additional Fees for International Application No. PCT/US2019/013678 mailed Apr. 15, 2020.
International Search Report and Written Opinion for International Application No. PCT/US2019/013678 mailed Jun. 23, 2020.
Invitation to Pay Additional Fees for International Application No. PCT/US2019/016295 mailed May 3, 2019.
International Search Report and Written Opinion for International Application No. PCT/US2019/016295 mailed Jun. 26, 2019.
International Preliminary Report on Patentability for International Application No. PCT/US2019/016295 mailed Aug. 13, 2020.
International Search Report and Written Opinion for International Application No. PCT/US2021/020602 mailed May 11, 2021.
International Preliminary Report on Patentability for International Application No. PCT/US2021/020602, mailed Sep. 15, 2022.
International Search Report and Written Opinion for International Application No. PCT/US2020/055952 mailed Jan. 28, 2021.
International Preliminary Report on Patentability for International Application No. PCT/US2020/055952 mailed Apr. 28, 2022.
International Search Report and Written Opinion for International Application No. PCT/US2019/060028 mailed Mar. 23, 2020.
International Preliminary Report on Patentability for International Application No. PCT/US2019/060028 mailed May 20, 2021.
International Search Report and Written Opinion for International Application No. PCT/US2022/042492 mailed Jan. 11, 2023.
[No Author Listed] Arm Limited: AMBA® AXI™ and ACE™ Protocol Specification. Oct. 28, 2011:1-306. [https://capocaccia.ethz.ch/capo/raw-attachment/wiki/2014/microblaze14/AX14_specification.pdf.].
Alves-Foss et al., Evaluating the Use of Security Tags in Security Policy Enforcement Mechanisms. 2015 48th Hawaii International Conference on System Sciences Jan. 5, 2015:5201-10.
Berlekamp, Algebraic coding theory (revised edition). World Scientific; Mar. 26, 2015. 34 pages.
Calder et al., Process Algebra for Event-Driven Runtime Verification: A Case Study of Wireless Network Management. IFM LNCS 2012;21-23.
Dalton et al., Raksha: a flexible information flow architecture for software security. ACM Proceedings of the 34$^{th}$ Annual International Symposium In Computer Architecture. Jun. 9, 2007;35(2):482-93.
Dalton et al., Real-World Buffer Overflow Protection for Userspace and Kernelspace. USENIX Security Symposium Jul. 28, 2008;395-410.
De Amorim et al., A verified information-flow architecture. Proceedings of the 41st ACM SIGPLAN-SIGACT Symposium on Principles of Programming Languages Jan. 8, 2014:165-78.
De Amorim et al., Micro-policies: Formally verified, tag-based security monitors. 2015 IEEE Symposium on Security and Privacy May 17, 2015:813-30.
Dehon et al., Dover A Metadata-Extended RISC-V. Jan. 6, 2016:34. [https://web.archive.org/web/20160331131339_if_/http://riscv.org/wp-content/uploads/2016/01/Wedl430-dover riscv jan2016 v3.pdf].

Dehon et al., DOVER: A metadata-extended RISC-V. RISC-V Workshop Oracle Conference Center, Redwood Shores, CA. Jan. 6, 2016. 33 pages.
Dhawan et al., Architectural support for software-defined metadata processing. Proceedings of the Twentieth International Conference on Architectural Support for Programming Languages and Operating Systems (ASPLOS). Mar. 14, 2015:487-502.
Dhawan et al., Area-efficient near-associative memories on FPGAs. ACM Transactions on Reconfigurable Technology and Systems (TRETS). Jan. 23, 2015;7(4):1-22.
Dhawan et al., PUMP: a programmable unit for metadata processing. Proceedings of the Third Workshop on Hardware and Architectural Support for Security and Privacy (HASP). Jun. 15, 2014:1-8.
Engelke et al., Efficient LLVM-Based Dynamic Binary Translation. ACM VEE. Apr. 16, 2021;165-71.
Evans et al., Melding security metadata between software and hardware. Proceedings of the Posters and Demo Track Dec. 3, 2012:1-2.
Geater, TEE requirements for ISA. Thales eSecurity. 2018. 21 pages.
Hriţcu, Micro-policies: Formally verified, tag-based security monitors. Proceedings of the 10th ACM Workshop on Programming Languages and Analysis for Security Jul. 4, 2015.
Hunt et al., The Seven Properties of Highly Secure Devices. 2021. 10 pages.
Juglaret et al., Towards a fully abstract compiler using Micro-Policies: Secure compilation for mutually distrustful components. arXiv preprint arXiv:1510.00697. Oct. 2, 2015. 31 pages.
Kane, Runtime Monitoring for Safety-Critical Embedded Systems. Carnegie Mellon University. Feb. 2015;207 pages.
Kannan et al., Decoupling dynamic information flow tracking with a dedicated coprocessor. 2009 IEEE/IFIP International Conference on Dependable Systems & Networks. Jun. 29, 2009:105-14.
Mambretti et al., Trellis: Privilege separation for multi-user applications made easy. International Symposium on Research in Attacks, Intrusions, and Defenses. Springer, Cham. Sep. 19, 2016:437-56.
Mutlu, 18-447 Computer Architecture Lecture 11: Precise Exceptions, State Maintenance, State Recovery. Carnegie Mellon University Lecture. Feb. 11, 2015, 49 pages.
Nagarakatte et al., SoftBound: Highly Compatible and Complete Spatial Memory Safety for C. University of Pennsylvania Department of Computer and Information Science Technical Report. Jan. 2009. 12 pages.
Okhravi et al., One Giant Leap for Computer Security. IEEE Computer and Reliability Societies. Jul./Aug. 2020;18(4):8-19.
Ozsoy et al., SIFT: A low-overhead dynamic information flow tracking architecture for smt processors. Proceedings of the 8th ACM International Conference on Computing Frontiers. May 3, 2011:1-11.
Roessler et al., Protecting the stack with metadata policies and tagged hardware. 2018 IEEE Symposium on Security and Privacy (SP) May 20, 2018;478-95.
Song et al., Security tagging for a zero-kernel operating system. 2013 46th Hawaii International Conference on System Sciences Jan. 7, 2013:5049-58.
Song et al., The 4th lowRISC Release: Tagged Memory and Minion Core. University of Cambridge. May 2017. 20 pages. https://riscv.org/wp-content/uploads/2017/05/Wed0930riscv201705_ppt.pdf [Last accessed Mar. 31, 2022].
Suh et al., Secure Program Execution via Dynamic Information Flow Tracking. MIT CSAIL. Jul. 2003. 14 pages.
Sullivan et al., The dover inherently secure processor. 2017 IEEE International Symposium on Technologies for Homeland Security (HST) Apr. 25, 2017:1-5.
Tiwari et al., A small cache of large ranges: Hardware methods for efficiently searching, storing, and updating big dataflow tags. 2008 41st IEEE/ACM International Symposium on Microarchitecture Nov. 8, 2008:94-105.
Tiwari et al., Complete information flow tracking from the gates up. InProceedings of the 14th international conference on Architectural support for programming languages and operating systems Mar. 7, 2009;109-20.

(56) References Cited

OTHER PUBLICATIONS

Waterman et al., The RISC-V Instruction Set Manual, vol. I: Unprivileged ISA, Document Version Dec. 13, 2019. RISC-V Foundation. Dec. 2019. 238 pages.

Watson et al., Cheri: A hybrid capability-system architecture for scalable software compartmentalization. 2015 IEEE Symposium on Security and Privacy Sep. 2015;20-37.

Witchel et al., Mondrian Memory Protection. ASPLOS-X. 2002;13 pages.

Woodruff, Cheri: A RISC capability machine for practical memory safety. University of Cambridge, Computer Laboratory; 2014. 112 pages.

Zeldovich et al., Hardware Enforcement of Application Security Policies Using Tagged Memory. USENIX Symposium on Operating Systems Design and Implementation. Dec. 8, 2008:8;225-40.

\* cited by examiner

FIG. 3

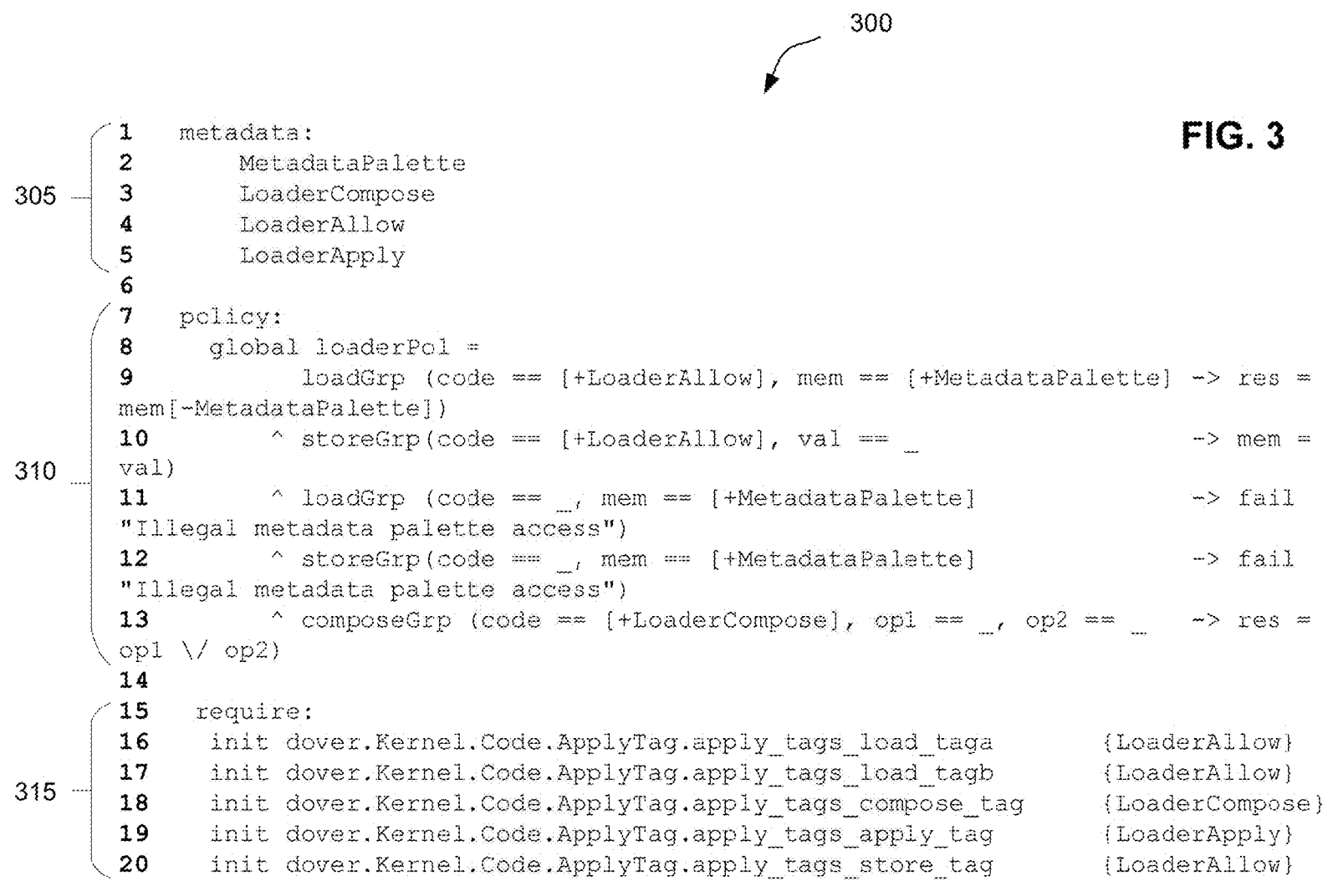

```
1   metadata:
2       MetadataPalette
3           LoaderCompose
4           LoaderAllow
5           LoaderApply
6
7   policy:
8       global loaderPol =
9           loadGrp (code == [+LoaderAllow], mem == [+MetadataPalette] -> res =
    mem[-MetadataPalette]
10          ^ storeGrp(code == [+LoaderAllow], val ==  _                      -> mem =
    val)
11          ^ loadGrp (code ==  _ , mem == [+MetadataPalette]                 -> fail
    "Illegal metadata palette access")
12          ^ storeGrp(code ==  _ , mem == [+MetadataPalette]                 -> fail
    "Illegal metadata palette access")
13          ^ composeGrp (code == [+LoaderCompose], op1 ==  _ , op2 ==  _     -> res =
    op1 \/ op2)
14
15  require:
16      init dover.Kernel.Code.ApplyTag.apply_tags_load_taga               {LoaderAllow}
17      init dover.Kernel.Code.ApplyTag.apply_tags_load_tagb               {LoaderAllow}
18      init dover.Kernel.Code.ApplyTag.apply_tags_compose_tag             {LoaderCompose}
19      init dover.Kernel.Code.ApplyTag.apply_tags_apply_tag               {LoaderApply}
20      init dover.Kernel.Code.ApplyTag.apply_tags_store_tag               {LoaderAllow}
```

305 — (lines 1–5)
310 — (lines 7–13)
315 — (lines 15–20)

300

```
if (ts_contains(ops->ci, og_dover_riscv_storeGrp))  {
    policyResult = (ts_contains(ops->mem,
dover_loader_MetadataPalette));
    if (policyResult) {
        return policyExpFailure;
    } else
        policyResult = policyImpFailure;
}
```

FIG. 4

```
00000424 <apply_md>:
     424:   0002a783    lw    a5,0(t0)
metadata: dover.riscv.allGrp, dover.riscv.loadGrp, dover.loader.LoaderAllow
     428:   00460613    addi  a2,a2,4
metadata: dover.riscv.allGrp
     42c:   02d65063    ble   a3,a2,44c <apply_md_write_mem>
metadata: dover.riscv.allGrp 00000430 <apply_md_compose_loop>:
     430:   00062283    lw    t0,0(a2)
metadata: dover.riscv.allGrp, dover.riscv.loadGrp, dover.loader.LoaderAllow
     434:   0002a283    lw    t0,0(t0)
metadata: dover.riscv.allGrp
     438:   00000013    nop
metadata: dover.riscv.allGrp
     43c:   00f2e7b3    or    a5,t0,a5
metadata: dover.riscv.allGrp, dover.loader.composeGrp, dover.loader.LoaderCompose
       ...
     448:   fed644e3    blt   a2,a3,430 <apply_md_compose_loop>
metadata: dover.riscv.allGrp 0000044c <apply_md_write_mem>:
     44c:   00259593    slli  a1,a1,0x2
metadata: dover.riscv.allGrp
```

FIG. 6

```
policy:
  cptPol =
    arithGrp(code == [(Cpt id)], env == [(Cpt id)], op1 == [(Cpt id)], op2 == [(Cpt
id)] -> env = {(Cpt id)}, res = {(Cpt id)})

^ immArithGrp(code == [(Cpt id)], env == [(Cpt id)], op1 == [(Cpt id)] -> env =
{(Cpt id)}, res = {(Cpt id)})

^ mulDivRemGrp(code == [(Cpt id)], env == [(Cpt id)], op1 == [(Cpt id)], op2 ==
[(Cpt id)] -> env = {(Cpt id)}, res = {(Cpt id)})

^ branchGrp(code == [(Cpt id)], env == [(Cpt id)], op1 == [(Cpt id)], op2 ==
[(Cpt id)] -> env = {(Cpt id)})

^ jumpRegGrp(code == [(Cpt id)], env == [(Cpt id)], target == [(Cpt id)] -> env =
[(Cpt id)], return = {(Cpt id)})

^ jumpGrp(code == [(Cpt id)], env == [(Cpt id)] -> env = {(Cpt id)}, return =
{(Cpt id)})

// Allow load store to memory
  ^ loadGrp(code == [(Cpt id)], mem == [(Cpt id)], addr == [(Cpt id)], env ==
[(Cpt id)] -> res = {(Cpt id)}, env = {(Cpt id)})

^ storeGrp(code == [(Cpt id)], mem == [(Cpt id)], addr == [(Cpt id)], val ==
[(Cpt id)], env == [(Cpt id)] -> mem = {(Cpt id)}, env = {(Cpt id)})
```

FIG. 8

```
        if (ts_contains(ops->ci, og_dover_riscv_arithGrp)) {
            policyResult = ops->op2->tags[2] == ops->ci->tags[2] &&
            ((1 && ts_contains(ops->op2, dover_frtos_cpt_Cpt)) &&
              (ops->op1->tags[2] == ops->ci->tags[2] &&
                ((ts_contains(ops->op1, dover_frtos_cpt_Cpt)) &&
                  (ops->pc->tags[2] == ops->ci->tags[2] &&
                    (ops->pc == ops->pc &&
                      ((ts_contains(ops->pc, dover_frtos_cpt_Cpt)) &&
                        ((ts_contains(ops->ci,
dover_frtos_cpt_Cpt))))))))));
            if (policyResult) {
                {
                    meta_set_t tseEvalVar0;

tseEvalVar0.tags[0] = 65536;
                    tseEvalVar0.tags[1] = 0;
                    tseEvalVar0.tags[2] = ops->ci->tags[2];
                    ;
                    for (int i = 0; i < META_SET_BITFIELDS; i++)
                        res->pc->tags[i] |= tseEvalVar0.tags[i] &
policy_mask_cptPol[i];
                    for (int i = META_SET_BITFIELDS; i <
META_SET_WORDS; i++) {
                        if (policy_mask_cptPol[i])
                            res->pc->tags[i] = tseEvalVar0.tags[i];
                    }
                    res->pcResult = true;
                }
                {
                    meta_set_t tseEvalVar0;

tseEvalVar0.tags[0] = 65536;
                    tseEvalVar0.tags[1] = 0;
                    tseEvalVar0.tags[2] = ops->ci->tags[2];
                    ;
                    for (int i = 0; i < META_SET_BITFIELDS; i++)
                        res->rd->tags[i] |= tseEvalVar0.tags[i] &
policy_mask_cptPol[i];
                    for (int i = META_SET_BITFIELDS; i <
META_SET_WORDS; i++) {
                        if (policy_mask_cptPol[i])
                            res->rd->tags[i] = tseEvalVar0.tags[i];
                    }
                    res->rdResult = true;
                }
                return policySuccess;
            } else
                policyResult = policyImpFailure;
        }
```

FIG. 9

```
// Rules for communicating between compartments
< loadGrp| code == [(Cpt id)], mem == [(Rd id)], addr == [(Cpt id)], env ==
[(Cpt id)] -> res = {(Cpt id)}, env = {(Cpt id)})

< storeGrp| code == [(Cpt id)], mem == [(Wr id)], addr == [(Cpt id)], val ==
[(Cpt id)], env == [(Cpt id)] -> mem = {(Wr id)}, env = {(Cpt id)})
```

FIG. 10

SYSTEMS AND METHODS FOR POLICY LINKING AND/OR LOADING FOR SECURE INITIALIZATION

RELATED APPLICATIONS

This application is a Continuation of U.S. application Ser. No. 17/711,092, filed Apr. 1, 2022, entitled "SYSTEMS AND METHODS FOR POLICY LINKING AND/OR LOADING FOR SECURE INITIALIZATION", which is a Continuation of U.S. application Ser. No. 16/966,616, filed Jul. 31, 2020, entitled "SYSTEMS AND METHODS FOR POLICY LINKING AND/OR LOADING FOR SECURE INITIALIZATION", which is a national stage filing under 35 U.S.C. § 371 of International Patent Application Serial No. PCT/US2019/016272, filed Feb. 1, 2019, which claims priority to the benefit under 35 U.S.C. § 119 (e) of U.S. Provisional Patent Application Ser. No. 62/625,822, filed on Feb. 2, 2018, titled "SYSTEMS AND METHODS FOR SECURE INITIALIZATION,", and U.S. Provisional Patent Application Ser. No. 62/635,289, filed on Feb. 26, 2018, titled "SYSTEMS AND METHODS FOR SECURE INITIALIZATION,", each of which is hereby incorporated by reference in its entirety.

This application is being filed on the same day as:
The national stage filing under 35 U.S.C. § 371 of International Patent Application Serial No. PCT/US2019/016276, filed Feb. 1, 2019, titled "SYSTEMS AND METHODS FOR TRANSFORMING INSTRUCTIONS FOR METADATA PROCESSING, ", claiming the benefit under 35 U.S.C. § 119 (e) of U.S. Provisional Patent Application Ser. No. 62/625,746, filed on Feb. 2, 2018, titled "SYSTEMS AND METHODS FOR TRANSLATING BETWEEN INSTRUCTION SET ARCHITECTURES,", U.S. Provisional Patent Application Ser. No. 62/635,319, filed on Feb. 26, 2018, titled "SYSTEMS AND METHODS FOR TRANSFORMING INSTRUCTIONS FOR METADATA PROCESSING,", and U.S. Provisional Patent Application Ser. No. 62/625,802, filed on Feb. 2, 2018, titled "SYSTEMS AND METHODS FOR SECURING INTERRUPT SERVICE ROUTINE ENTRY,"; and.
The national stage filing under 35 U.S.C. § 371 of International Patent Application Serial No. PCT/US2019/016317, filed Feb. 1, 2019, titled "SYSTEMS AND METHODS FOR POST CACHE INTERLOCKING,", claiming the benefit under 35 U.S.C. § 119 (e) of U.S. Provisional Patent Application Ser. No. 62/625,770, titled "SYSTEMS AND METHODS FOR POST CACHE INTERLOCKING," filed on Feb. 2, 2018, and Provisional Patent Application Ser. No. 62/635,475, titled "SYSTEMS AND METHODS FOR POST CACHE INTERLOCKING," filed on Feb. 26, 2018.

Each of the above-referenced applications is hereby incorporated by reference in its entirety.

BACKGROUND

Computer security has become an increasingly urgent concern at all levels of society, from individuals to businesses to government institutions. For example, in 2015, security researchers identified a zero-day vulnerability that would have allowed an attacker to hack into a Jeep Cherokee's on-board computer system via the Internet and take control of the vehicle's dashboard functions, steering, brakes, and transmission. In 2017, the WannaCry ransomware attack was estimated to have affected more than 200,000 computers worldwide, causing at least hundreds of millions of dollars in economic losses. Notably, the attack crippled operations at several National Health Service hospitals in the UK. In the same year, a data breach at Equifax, a US consumer credit reporting agency, exposed person data such as full names, social security numbers, birth dates, addresses, driver's license numbers, credit card numbers, etc. That attack is reported to have affected over 140 million consumers.

Security professionals are constantly playing catch-up with attackers. As soon as a vulnerability is reported, security professionals race to patch the vulnerability. Individuals and organizations that fail to patch vulnerabilities in a timely manner (e.g., due to poor governance and/or lack of resources) become easy targets for attackers.

Some security software monitors activities on a computer and/or within a network, and looks for patterns that may be indicative of an attack. Such an approach does not prevent malicious code from being executed in the first place. Often, the damage has been done by the time any suspicious pattern emerges.

SUMMARY

According to at least one aspect, a system is provided. The system comprises at least one processor programmed to identify, based on a policy to be enforced, one or more metadata symbols corresponding to an entity name; identify, from a target description describing a target system, an entity description matching the entity name, wherein the entity description describes an entity of the target system; and apply a metadata label to the entity of the target system, wherein the metadata label is based on the one or more metadata symbols corresponding to the entity name, as identified based on the policy.

In some embodiments, the at least one processor is further programmed to construct the metadata label at least in part by including, in the metadata label, an indication that the one or more metadata symbols pertain to the policy.

In some embodiments, the policy is to be enforced during execution of object code of one or more programs; the object code is in a loadable binary format; and the at least one processor is programmed to apply the metadata label to the entity at least in part by annotating at least one portion of the object code with a binary representation of the metadata label.

In some embodiments, the at least one processor is further programmed to identify the at least one portion of the object code to be annotated, at least in part by using the entity description to identify one or more object symbol names and one or more address ranges associated with the entity; and identifying, from the object code, based on the one or more address ranges, one or more instructions matching the one or more object symbol names; and annotating the at least one portion of the object code comprises annotating the one or more instructions identified from the object code with the binary representation of the metadata label.

In some embodiments, the at least one processor is further programmed to generate an initialization specification based at least in part on the policy and the target description; and the at least one processor is programmed to apply the metadata label to the entity at least in part by including, in the initialization specification, an indication that the entity is associated with the metadata label.

In some embodiments, the at least one processor is further programmed to resolve at least one metadata symbol of the one or more metadata symbols into a binary representation;

and the binary representation of the at least one metadata symbol is included in the initialization specification.

In some embodiments, the initialization specification is in a loadable binary format.

In some embodiments, the entity comprises a hardware entity; the entity description comprises a named property of the hardware entity; and the at least one processor is programmed to parse a hardware specification and generate the named property based on information extracted from the hardware specification.

In some embodiments, the entity comprises a software entity; the entity description comprises a named property of the software entity; and the at least one processor is programmed to generate the named property based on analysis of source code and/or object code of the software entity.

According to at least one aspect, as system is provided. The system comprises at least one processor programmed to, in response to a piece of object code being loaded to a location in an application memory, identify, based on an initialization specification, at least one metadata label associated with the piece of object code; and associate the location in the application memory, where the piece of object code is loaded, with the at least one metadata label.

In some embodiments, the piece of object code comprises one or more executable instructions.

In some embodiments, the piece of object code comprises data to be manipulated by one or more executable instructions.

In some embodiments, the at least one processor is programmed to associate the location in the application memory with the at least one metadata label at least in part by creating an entry in a tag map table, the entry mapping the location in the application memory to the at least one metadata label.

In some embodiments, the entry in the tag map table stores a binary representation of the at least one metadata label.

In some embodiments, the entry in the tag map table stores information indicative of a location at which a binary representation of the at least one metadata label is stored.

In some embodiments, the information comprises an address in a metadata memory at which the binary representation of the at least one metadata label is stored.

In some embodiments, the metadata memory is physically separate from the application memory.

In some embodiments, the information comprises an identifier for a register at which the binary representation of the at least one metadata label is stored.

In some embodiments, the location in the application memory where the piece of object code is loaded is at a first address; the location at which the binary representation of the at least one metadata label is stored is at a second address; and the entry in the tag map table maps the first address to the second address via an address translation.

In some embodiments, the system further comprises policy enforcement hardware, wherein the at least one processor is programmed to associate the location in the application memory with the at least one metadata label at least in part by causing the policy enforcement hardware to evaluate one or more rules; evaluation of the one or more rules comprises looking up the tag map table for an entry corresponding to the location in the application memory; and the policy enforcement hardware is configured to, in response to determining that the tag map table does not already include an entry corresponding to the location in the application memory, create the entry in the tag map table mapping the location in the application memory to the at least one metadata label.

In some embodiments, the at least one processor is further programmed to resolve the at least one metadata label into at least one binary representation; and associating the location in the application memory with the at least one metadata label comprises associating the location in the application memory with the at least one binary representation of the at least one metadata label.

In some embodiments, the piece of object code comprises object code of a user application that is loaded dynamically; and the at least one processor is programmed to dynamically resolve the at least one metadata label into the at least one binary representation; and dynamically associate the location in the application memory with the at least one binary representation of the at least one metadata label.

In some embodiments, the at least one processor is further programmed to confirm that the initialization specification is from a trusted source, at least in part by verifying a cryptographic signature on the initialization specification; and the at least one processor is programmed to associate the location in the application memory with the at least one metadata label only in response to confirming that the initialization specification is from a trusted source.

In some embodiments, the at least one metadata label comprises a first metadata label; the at least one processor is further programmed to confirm that the piece of object code is from a trusted source, at least in part by verifying a cryptographic signature on the piece of object code; and associate the piece of object code with a second metadata label indicating that the piece of object code is from a trusted source.

In some embodiments, the system further comprises policy enforcement hardware, wherein the at least one metadata label comprises a default metadata label; the at least one processor is further programmed to cause the policy enforcement hardware to evaluate one or more rules; and evaluation of the one or more rules causes the policy enforcement hardware to replace the default metadata label with another metadata label.

According to at least one aspect a system is provided. The system comprises at least one processor programmed to identify metadata associated with an entity in a target system, wherein the metadata comprises a binary representation of a metadata label; use stored information to map the binary representation to a different representation of the metadata label; and display the metadata label in a human readable form, in a manner that indicates the metadata label is associated with the entity in the target system.

In some embodiments, the at least one processor is further programmed to resolve metadata labels into respective binary representations; and the stored information comprises a mapping from the binary representations back to the metadata labels.

In some embodiments, the at least one processor is further programmed to display, in human readable form, an initialization specification mapping a plurality of entities of the target system to respective sets of one or more metadata labels.

In some embodiments, the at least one processor is further programmed to receive a request from a user to examine a policy violation; and in response to the request, determine that the entity of the target system is related to the policy violation.

According to at least one aspect, a method performed by the system of any of the preceding aspects and embodiments is provided.

According to at least one aspect, at least one computer-readable medium is provided having encoded thereon instructions which, when executed by at least one processor, cause the at least one processor to perform the method of the aspects and embodiments defined above.

BRIEF DESCRIPTION OF DRAWINGS

FIG. 3 shows an illustrative policy 300 for securing a loader program, in accordance with some embodiments.

FIG. 4 shows illustrative policy code 400 output by a policy compiler, in accordance with some embodiments.

FIG. 6 shows illustrative assembly code 600 that has been annotated with metadata labels, in accordance with some embodiments.

FIG. 8 shows an illustrative compartment policy 800, in accordance with some embodiments.

FIG. 9 shows illustrative policy code 900 that may be generated by a policy compiler from rule 1 in the example of FIG. 8, in accordance with some embodiments.

FIG. 10 shows illustrative policy code 1000 with communication rules, in accordance with some embodiments.

DETAILED DESCRIPTION

Many vulnerabilities exploited by attackers trace back to a computer architectural design where data and executable instructions are intermingled in a same memory. This intermingling allows an attacker to inject malicious code into a remote computer by disguising the malicious code as data. For instance, a program may allocate a buffer in a computer's memory to store data received via a network. If the program receives more data than the buffer can hold, but does not check the size of the received data prior to writing the data into the buffer, part of the received data would be written beyond the buffer's boundary, into adjacent memory. An attacker may exploit this behavior to inject malicious code into the adjacent memory. If the adjacent memory is allocated for executable code, the malicious code may eventually be executed by the computer.

Techniques have been proposed to make computer hardware more security aware. For instance, memory locations may be associated with metadata for use in enforcing security policies, and instructions may be checked for compliance with the security policies. For example, given an instruction to be executed, metadata associated with the instruction and/or metadata associated with one or more operands of the instruction may be checked to determine if the instruction should be allowed. Additionally, or alternatively, appropriate metadata may be associated with an output of the instruction.

Figure 1:
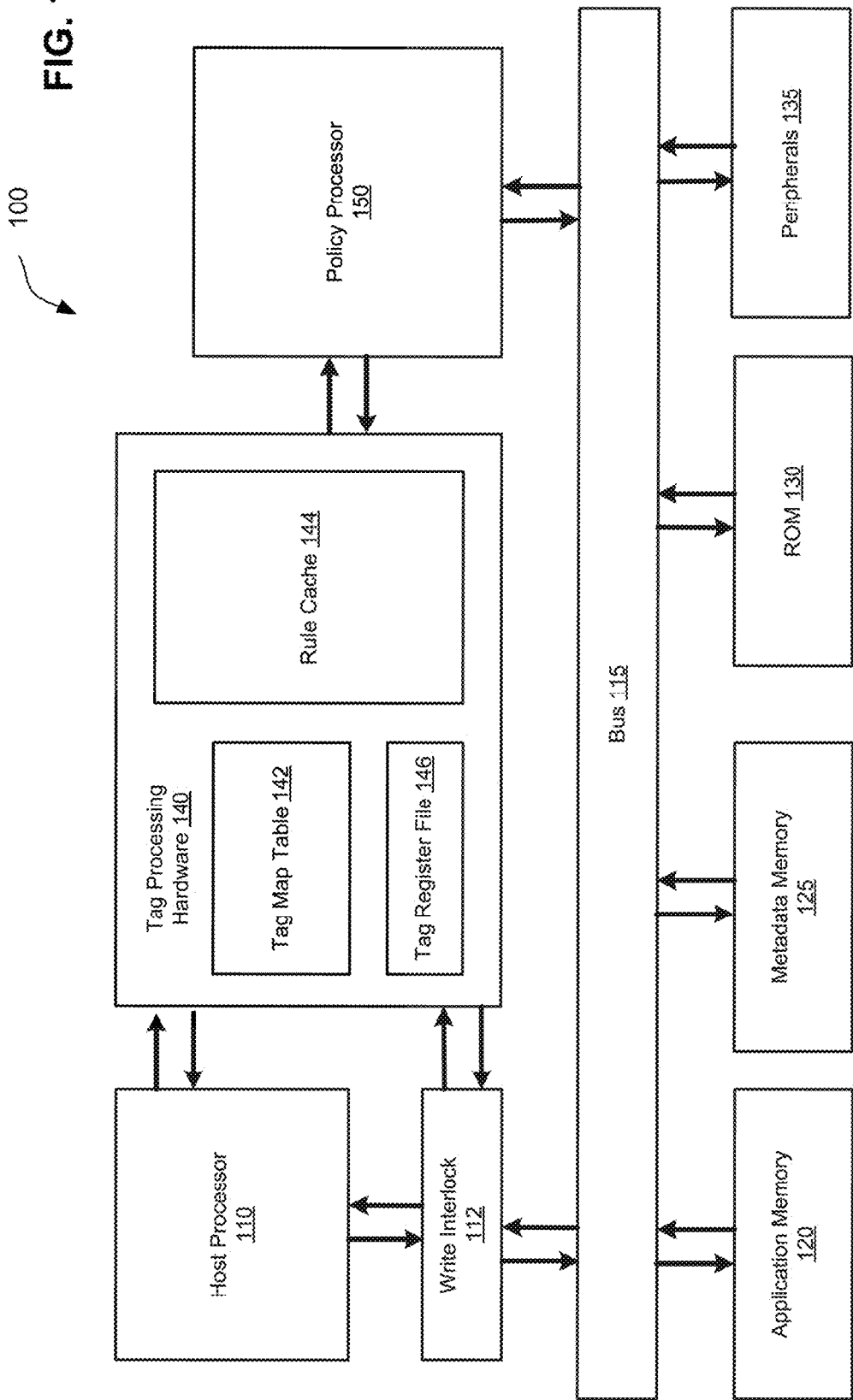
FIG. 1 shows an illustrative hardware system 100 for enforcing policies, in accordance with some embodiments.

FIG. 1 shows an illustrative hardware system 100 for enforcing policies, in accordance with some embodiments. In this example, the system 100 includes a host processor 110, which may have any suitable instruction set architecture (ISA) such as a reduced instruction set computing (RISC) architecture or a complex instruction set computing (CISC) architecture. The host processor 110 may perform memory accesses via a write interlock 112. The write interlock 112 may be connected to a system bus 115 configured to transfer data between various components such as the write interlock 112, an application memory 120, a metadata memory 125, a read-only memory (ROM) 130, one or more peripherals 135, etc.

In some embodiments, data that is manipulated (e.g., modified, consumed, and/or produced) by the host processor 110 may be stored in the application memory 120. Such data is referred to herein as "application data," as distinguished from metadata used for enforcing policies. The latter may be stored in the metadata memory 125. It should be appreciated that application data may include data manipulated by an operating system (OS), instructions of the OS, data manipulated by one or more user applications, and/or instructions of the one or more user applications.

In some embodiments, the application memory 120 and the metadata memory 125 may be physically separate, and the host processor 110 may have no access to the metadata memory 125. In this manner, even if an attacker succeeds in injecting malicious code into the application memory 120 and causing the host processor 110 to execute the malicious code, the metadata memory 125 may not be affected. However, it should be appreciated that aspects of the present disclosure are not limited to storing application data and metadata on physically separate memories. Additionally, or alternatively, metadata may be stored in a same memory as application data, and a memory management component may be used that implements an appropriate protection scheme to prevent instructions executing on the host processor 110 from modifying the metadata. Additionally, or alternatively, metadata may be intermingled with application data in a same memory, and one or more policies may be used to protect the metadata.

In some embodiments, tag processing hardware 140 may be provided to ensure that instructions being executed by the host processor 110 comply with one or more policies. The tag processing hardware 140 may include any suitable circuit component or combination of circuit components. For instance, the tag processing hardware 140 may include a tag map table 142 that maps addresses in the application memory 120 to addresses in the metadata memory 125. For example, the tag map table 142 may map address X in the application memory 120 to address Y in the metadata memory 125. Such an address Y is referred to herein as a "metadata tag" or simply a "tag." A value stored at the address Y is also referred to herein as a "metadata tag" or simply a "tag."

In some embodiments, a value stored at the address Y may in turn be an address Z. Such indirection may be repeated any suitable number of times, and may eventually lead to a data structure in the metadata memory 125 for storing metadata. Such metadata, as well as any intermediate address (e.g., the address Z), are also referred to herein as "metadata tags" or simply "tags."

It should be appreciated that aspects of the present disclosure are not limited to a tag map table that stores addresses in a metadata memory. In some embodiments, a tag map table entry itself may store metadata, so that the tag processing hardware 140 may be able to access the metadata without performing a memory operation. In some embodiments, a tag map table entry may store a selected bit pattern, where a first portion of the bit pattern may encode metadata, and a second portion of the bit pattern may encode an address in a metadata memory where further metadata may be stored. This may provide a desired balance between speed and expressivity. For instance, the tag processing hardware 140 may be able to check certain policies quickly, using only the metadata stored in the tag map table entry itself. For other policies with more complex rules, the tag processing hardware 140 may access the further metadata stored in the metadata memory 125.

Referring again to FIG. 1, by mapping application memory addresses to metadata memory addresses, the tag map table 142 may create an association between application data and metadata that describes the application data. In one example, metadata stored at the metadata memory address Y and thus associated with application data stored at the application memory address X may indicate that the application data may be readable, writable, and/or executable. In another example, metadata stored at the metadata memory address Y and thus associated with application data stored at the application memory address X may indicate a type of the application data (e.g., integer, pointer, 16-bit word, 32-bit word, etc.). Depending on a policy to be enforced, any suitable metadata relevant for the policy may be associated with a piece of application data.

In some embodiments, a metadata memory address Z may be stored at the metadata memory address Y. Metadata to be associated with the application data stored at the application memory address X may be stored at the metadata memory address Z, instead of (or in addition to) the metadata memory address Y. For instance, a binary representation of a metadata symbol "RED" may be stored at the metadata memory address Z. By storing the metadata memory address Z in the metadata memory address Y, the application data stored at the application memory address X may be tagged "RED."

In this manner, the binary representation of the metadata symbol "RED" may be stored only once in the metadata memory 120. For instance, if application data stored at another application memory address X' is also to be tagged "RED," the tag map table 142 may map the application memory address X' to a metadata memory address Y' where the metadata memory address Z is also stored.

Moreover, in this manner, tag update may be simplified. For instance, if the application data stored at the application memory address X is to be tagged "BLUE" at a subsequent time, a metadata memory address Z' may be written at the metadata memory address Y, to replace the metadata memory address Z, and a binary representation of the metadata symbol "BLUE" may be stored at the metadata memory address Z'.

Thus, the inventors have recognized and appreciated that a chain of metadata memory addresses of any suitable length N may be used for tagging, including N=0 (e.g., where a binary representation of a metadata symbol is stored at the metadata memory address Y itself).

The association between application data and metadata (also referred to herein as "tagging") may be done at any suitable level of granularity, and/or variable granularity. For instance, tagging may be done on a word-by-word basis. Additionally, or alternatively, a region in memory may be mapped to a single tag, so that all words in that region are associated with the same metadata. This may advantageously reduce a size of the tag map table 142 and/or the metadata memory 125. For example, a single tag may be maintained for an entire address range, as opposed to maintaining multiple tags corresponding, respectively, to different addresses in the address range.

In some embodiments, the tag processing hardware 140 may be configured to apply one or more security rules to metadata associated with an instruction and/or metadata associated with one or more operands of the instruction to determine if the instruction should be allowed. For instance, the host processor 110 may fetch and execute an instruction, and may queue a result of executing the instruction into the write interlock 112. Before the result is written back into the application memory 120, the host processor 110 may send, to the tag processing hardware 140, an instruction type (e.g., opcode), an address where the instruction is stored, one or more memory addresses referenced by the instruction, and/or one or more register identifiers. Such a register identifier may identify a register used by the host processor 110 in executing the instruction, such as a register for storing an operand or a result of the instruction.

In some embodiments, destructive read instructions may be queued in addition to, or instead of, write instructions. For instance, subsequent instructions attempting to access a target address of a destructive read instruction may be queued in a memory region that is not cached. If and when it is determined that the destructive read instruction should be allowed, the queued instructions may be loaded for execution.

In some embodiments, a destructive read instruction may be allowed to proceed, and data read from a target address may be captured in a buffer. If and when it is determined that the destructed read instruction should be allowed, the data captured in the buffer may be discarded. If and when it is determined that the destructive read instruction should not be allowed, the data captured in the buffer may be restored to the target address. Additionally, or alternatively, a subsequent read may be serviced by the buffered data.

It should be appreciated that aspects of the present disclosure are not limited to performing metadata processing on instructions that have been executed by a host processor, such as instructions that have been retired by the host processor's execution pipeline. In some embodiments, metadata processing may be performed on instructions before, during, and/or after the host processor's execution pipeline.

In some embodiments, given an address received from the host processor 110 (e.g., an address where an instruction is stored, or an address referenced by an instruction), the tag processing hardware 140 may use the tag map table 142 to identify a corresponding tag. Additionally, or alternatively, for a register identifier received from the host processor 110, the tag processing hardware 140 may access a tag from a tag register file 146 within the tag processing hardware 140.

In some embodiments, if an application memory address does not have a corresponding tag in the tag map table 142, the tag processing hardware 140 may send a query to a policy processor 150. The query may include the application memory address in question, and the policy processor 150 may return a tag for that application memory address. Additionally, or alternatively, the policy processor 150 may create a new tag map entry for an address range including the application memory address. In this manner, the appropriate tag may be made available, for future reference, in the tag map table 142 in association with the application memory address in question.

In some embodiments, the tag processing hardware 140 may send a query to the policy processor 150 to check if an instruction executed by the host processor 110 should be allowed. The query may include one or more inputs, such as an instruction type (e.g., opcode) of the instruction, a tag for a program counter, a tag for an application memory address from which the instruction is fetched (e.g., a word in memory to which the program counter points), a tag for a register in which an operand of the instruction is stored, and/or a tag for an application memory address referenced by the instruction. In one example, the instruction may be a load instruction, and an operand of the instruction may be an application memory address from which application data is to be loaded. The query may include, among other things, a tag for a register in which the application memory address is stored, as well as a tag for the application memory address itself. In another example, the instruction may be an arithmetic instruction, and there may be two operands. The query may include, among other things, a first tag for a first register in which a first operand is stored, and a second tag for a second register in which a second operand is stored.

It should also be appreciated that aspects of the present disclosure are not limited to performing metadata processing on a single instruction at a time. In some embodiments, multiple instructions in a host processor's ISA may be checked together as a bundle, for example, via a single query to the policy processor 150. Such a query may include more inputs to allow the policy processor 150 to check all of the instructions in the bundle. Similarly, a CISC instruction, which may correspond semantically to multiple operations, may be checked via a single query to the policy processor 150, where the query may include sufficient inputs to allow the policy processor 150 to check all of the constituent operations within the CISC instruction.

In some embodiments, the policy processor 150 may include a configurable processing unit, such as a microprocessor, a field-programmable gate array (FPGA), and/or any other suitable circuitry. The policy processor 150 may have loaded therein one or more policies that describe allowed operations of the host processor 110. In response to a query from the tag processing hardware 140, the policy processor 150 may evaluate one or more of the policies to determine if an instruction in question should be allowed. For instance, the tag processing hardware 140 may send an interrupt signal to the policy processor 150, along with one or more inputs relating to the instruction in question (e.g., as described above). The policy processor 150 may store the inputs of the query in a working memory (e.g., in one or more queues) for immediate or deferred processing. For example, the policy processor 150 may prioritize processing of queries in some suitable manner (e.g., based on a priority flag associated with each query).

In some embodiments, the policy processor 150 may evaluate one or more policies on one or more inputs (e.g., one or more input tags) to determine if an instruction in question should be allowed. If the instruction is not to be allowed, the policy processor 150 may so notify the tag processing hardware 140. If the instruction is to be allowed, the policy processor 150 may compute one or more outputs (e.g., one or more output tags) to be returned to the tag processing hardware 140. As one example, the instruction may be a store instruction, and the policy processor 150 may compute an output tag for an application memory address to which application data is to be stored. As another example, the instruction may be an arithmetic instruction, and the policy processor 150 may compute an output tag for a register for storing a result of executing the arithmetic instruction.

In some embodiments, the policy processor 150 may be programmed to perform one or more tasks in addition to, or instead of, those relating to evaluation of policies. For instance, the policy processor 150 may perform tasks relating to tag initialization, boot loading, application loading, memory management (e.g., garbage collection) for the metadata memory 125, logging, debugging support, and/or interrupt processing. One or more of these tasks may be performed in the background (e.g., between servicing queries from the tag processing hardware 140).

In some embodiments, the tag processing hardware 140 may include a rule cache 144 for mapping one or more input tags to a decision and/or one or more output tags. For instance, a query into the rule cache 144 may be similarly constructed as a query to the policy processor 150 to check if an instruction executed by the host processor 110 should be allowed. If there is a cache hit, the rule cache 144 may output a decision as to whether to the instruction should be allowed, and/or one or more output tags (e.g., as described above in connection with the policy processor 150). Such a mapping in the rule cache 144 may be created using a query response from the policy processor 150. However, that is not required, as in some embodiments, one or more mappings may be installed into the rule cache 144 ahead of time.

In some embodiments, the rule cache 144 may be used to provide a performance enhancement. For instance, before querying the policy processor 150 with one or more input tags, the tag processing hardware 140 may first query the rule cache 144 with the one or more input tags. In case of a cache hit, the tag processing hardware 140 may proceed with a decision and/or one or more output tags from the rule cache 144, without querying the policy processor 150. This may provide a significant speedup. In case of a cache miss, the tag processing hardware 140 may query the policy processor 150 and install a response from the policy processor 150 into the rule cache 144 for potential future use.

In some embodiments, if the tag processing hardware 140 determines that an instruction in question should be allowed (e.g., based on a hit in the rule cache 144, or a miss in the rule cache 144, followed by a response from the policy processor 150 indicating no policy violation has been found), the tag processing hardware 140 may indicate to the write interlock 112 that a result of executing the instruction may be written back to memory. Additionally, or alternatively, the tag processing hardware 140 may update the metadata memory 125, the tag map table 142, and/or the tag register file 146 with one or more output tags (e.g., as received from the rule cache 144 or the policy processor 150). As one example, for a store instruction, the metadata memory 125 may be updated via an address translation by the tag map table 142. For instance, an application memory address referenced by the store instruction may be used to look up a metadata memory address from the tag map table 142, and metadata received from the rule cache 144 or the policy processor 150 may be stored to the metadata memory 125 at the metadata memory address. As another example, where metadata to be updated is stored in an entry in the tag map table 142 (as opposed to being stored in the metadata memory 125), that entry in the tag map table 142 may be updated. As another example, for an arithmetic instruction, an entry in the tag register file 146 corresponding to a register used by the host processor 110 for storing a result of executing the arithmetic instruction may be updated with an appropriate tag.

In some embodiments, if the tag processing hardware 140 determines that the instruction in question represents a policy violation (e.g., based on a miss in the rule cache 144, followed by a response from the policy processor 150 indicating a policy violation has been found), the tag processing hardware 140 may indicate to the write interlock 112 that a result of executing the instruction should be discarded, instead of being written back to memory. Additionally, or alternatively, the tag processing hardware 140 may send an interrupt to the host processor 110. In response to receiving the interrupt, the host processor 110 may switch to any suitable violation processing code. For example, the host processor 100 may halt, reset, log the violation and continue, perform an integrity check on application code and/or application data, notify an operator, etc.

In some embodiments, the tag processing hardware 140 may include one or more configuration registers. Such a register may be accessible (e.g., by the policy processor 150) via a configuration interface of the tag processing hardware 140. In some embodiments, the tag register file 146 may be implemented as configuration registers. Additionally, or alternatively, there may be one or more application configuration registers and/or one or more metadata configuration registers.

Although details of implementation are shown in FIG. 1 and discussed above, it should be appreciated that aspects of the present disclosure are not limited to the use of any particular component, or combination of components, or to any particular arrangement of components. For instance, in some embodiments, one or more functionalities of the policy processor 150 may be performed by the host processor 110. As an example, the host processor 110 may have different operating modes, such as a user mode for user applications and a privileged mode for an operating system. Policy-related code (e.g., tagging, evaluating policies, etc.) may run in the same privileged mode as the operating system, or a different privileged mode (e.g., with even more protection against privilege escalation).

Figure 2:
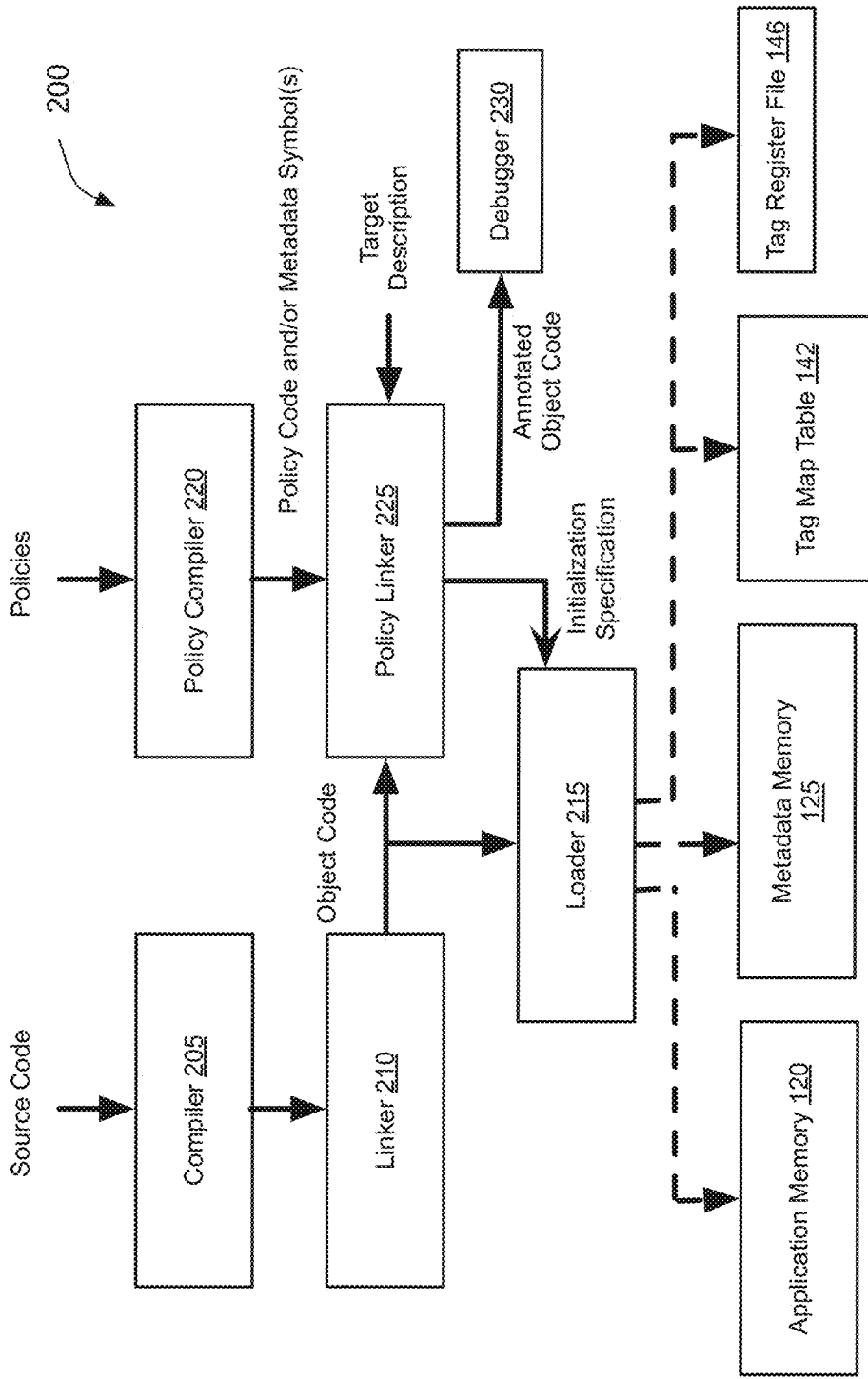
FIG. 2 shows an illustrative software system 200 for enforcing policies, in accordance with some embodiments.

FIG. 2 shows an illustrative software system 200 for enforcing policies, in accordance with some embodiments. For instance, the software system 200 may be programmed to generate executable code and/or load the executable code into the illustrative hardware system 100 shown in FIG. 1.

In the example shown in FIG. 2, the software system 200 includes a software toolchain having a compiler 205, a linker 210, and a loader 215. The compiler 205 may be programmed to process source code into executable code, where the source code may be in a higher-level language and the executable code may be in a lower level language. The linker 210 may be programmed to combine multiple object files generated by the compiler 205 into a single object file to be loaded by the loader 215 into memory (e.g., the illustrative application memory 120 in the example of FIG. 1). Although not shown, the object file output by the linker 210 may be converted into a suitable format and stored in persistent storage, such as flash memory, hard disk, read-only memory (ROM), etc. The loader 215 may retrieve the object file from the persistent storage, and load the object file into random-access memory (RAM).

In some embodiments, the compiler 205 may be programmed to generate information for use in enforcing policies. For instance, as the compiler 205 translates source code into executable code, the compiler 205 may generate information regarding data types, program semantics and/or memory layout. As one example, the compiler 205 may be programmed to mark a boundary between one or more instructions of a function and one or more instructions that implement calling convention operations (e.g., passing one or more parameters from a caller function to a callee function, returning one or more values from the callee function to the caller function, storing a return address to indicate where execution is to resume in the caller function's code when the callee function returns control back to the caller function, etc.). Such boundaries may be used, for instance, during initialization to tag certain instructions as function prologue or function epilogue. At run time, a stack policy may be enforced so that, as function prologue instructions execute, certain locations in a call stack (e.g., where a return address is stored) may be tagged as "frame" locations, and as function epilogue instructions execute, the "frame" tags may be removed. The stack policy may indicate that instructions implementing a body of the function (as opposed to function prologue and function epilogue) only have read access to "frame" locations. This may prevent an attacker from overwriting a return address and thereby gaining control.

As another example, the compiler 205 may be programmed to perform control flow analysis, for instance, to identify one or more control transfer points and respective destinations. Such information may be used in enforcing a control flow policy. As yet another example, the compiler 205 may be programmed to perform type analysis, for example, by applying type labels such as Pointer, Integer, Floating-Point Number, etc. Such information may be used to enforce a policy that prevents misuse (e.g., using a floating-point number as a pointer).

Although not shown in FIG. 2, the software system 200 may, in some embodiments, include a binary analysis component programmed to take, as input, object code produced by the linker 210 (as opposed to source code), and perform one or more analyses similar to those performed by the compiler 205 (e.g., control flow analysis, type analysis, etc.).

In the example of FIG. 2, the software system 200 further includes a policy compiler 220 and a policy linker 225. The policy compiler 220 may be programmed to translate a policy written in a policy language into policy code. For instance, the policy compiler 220 may output policy code in C or some other suitable programming language. Additionally, or alternatively, the policy compiler 220 may output one or more metadata symbols referenced by the policy. At initialization, such a metadata symbol may be associated with one or more memory locations, registers, and/or other machine state of a target system, and may be resolved into a binary representation of metadata to be loaded into a metadata memory or some other hardware storage (e.g., registers) of the target system. As discussed above, such a binary representation of metadata, or a pointer to a location at which the binary representation is stored, is sometimes referred to herein as a "tag."

It should be appreciated that aspects of the present disclosure are not limited to resolving metadata symbols at load time. In some embodiments, one or more metadata symbols may be resolved statically (e.g., at compile time or link time). For example, the policy compiler 220 may process one or more applicable policies, and resolve one or more metadata symbols defined by the one or more policies into a statically-defined binary representation. Additionally, or alternatively, the policy linker 225 may resolve one or more metadata symbols into a statically-defined binary representation, or a pointer to a data structure storing a statically-defined binary representation. The inventors have recognized and appreciated that resolving metadata symbols statically may advantageously reduce load time processing. However, aspects of the present disclosure are not limited to resolving metadata symbols in any particular manner.

In some embodiments, the policy linker 225 may be programmed to process object code (e.g., as output by the linker 210), policy code (e.g., as output by the policy compiler 220), and/or a target description, to output an initialization specification. The initialization specification may be used by the loader 215 to securely initialize a target system having one or more hardware components (e.g., the illustrative hardware system 100 shown in FIG. 1) and/or one or more software components (e.g., an operating system, one or more user applications, etc.).

In some embodiments, the target description may include descriptions of a plurality of named entities. A named entity may represent a component of a target system. As one example, a named entity may represent a hardware component, such as a configuration register, a program counter, a register file, a timer, a status flag, a memory transfer unit, an input/output device, etc. As another example, a named entity may represent a software component, such as a function, a module, a driver, a service routine, etc.

In some embodiments, the policy linker 225 may be programmed to search the target description to identify one or more entities to which a policy pertains. For instance, the policy may map certain entity names to corresponding metadata symbols, and the policy linker 225 may search the target description to identify entities having those entity names. The policy linker 225 may identify descriptions of those entities from the target description, and use the descriptions to annotate, with appropriate metadata symbols, the object code output by the linker 210. For instance, the policy linker 225 may apply a Read label to a .rodata section of an Executable and Linkable Format (ELF) file, a Read label and a Write label to a .data section of the ELF file, and an Execute label to a .text section of the ELF file. Such information may be used to enforce a policy for memory access control and/or executable code protection (e.g., by checking read, write, and/or execute privileges).

It should be appreciated that aspects of the present disclosure are not limited to providing a target description to the policy linker 225. In some embodiments, a target description may be provided to the policy compiler 220, in addition to, or instead of, the policy linker 225. The policy compiler 220 may check the target description for errors. For instance, if an entity referenced in a policy does not exist in the target description, an error may be flagged by the policy compiler 220. Additionally, or alternatively, the policy compiler 220 may search the target description for entities that are relevant for one or more policies to be enforced, and may produce a filtered target description that includes entities descriptions for the relevant entities only. For instance, the policy compiler 220 may match an entity name in an "init" statement of a policy to be enforced to an entity description in the target description, and may remove from the target description entity descriptions with no corresponding "init" statement.

In some embodiments, the loader 215 may initialize a target system based on an initialization specification produced by the policy linker 225. For instance, with reference to the example of FIG. 1, the loader 215 may load data and/or instructions into the application memory 120, and may use the initialization specification to identify metadata labels associated with the data and/or instructions being loaded into the application memory 120. The loader 215 may resolve the metadata labels in the initialization specification into respective binary representations. However, it should be appreciated that aspects of the present disclosure are not limited to resolving metadata labels at load time. In some embodiments, a universe of metadata labels may be known during policy linking, and therefore metadata labels may be resolved at that time, for example, by the policy linker 225. This may advantageously reduce load time processing of the initialization specification.

In some embodiments, the policy linker 225 and/or the loader 215 may maintain a mapping of binary representations of metadata back to metadata labels. Such a mapping may be used, for example, by a debugger 230. For instance, in some embodiments, the debugger 230 may be provided to display a human readable version of an initialization specification, which may list one or more entities and, for each entity, a set of one or more metadata labels associated with the entity. Additionally, or alternatively, the debugger 230 may be programmed to display assembly code annotated with metadata labels, such as assembly code generated by disassembling object code annotated with metadata labels. An example of such assembly code is shown in FIG. 6 and discussed below. During debugging, the debugger 230 may halt a program during execution, and allow inspection of entities and/or metadata tags associated with the entities, in human readable form. For instance, the debugger 230 may allow inspection of entities involved in a policy violation and/or metadata tags that caused the policy violation. The debugger 230 may do so using the mapping of binary representations of metadata back to metadata labels.

In some embodiments, a conventional debugging tool may be extended allow review of issues related to policy enforcement, for example, as described above. Additionally, or alternatively, a stand-alone policy debugging tool may be provided.

In some embodiments, the loader 215 may load the binary representations of the metadata labels into the metadata memory 125, and may record the mapping between application memory addresses and metadata memory addresses in the tag map table 142. For instance, the loader 215 may create an entry in the tag map table 142 that maps an application memory address where an instruction is stored in the application memory 120, to a metadata memory address where metadata associated with the instruction is stored in the metadata memory 125. Additionally, or alternatively, the loader 215 may store metadata in the tag map table 142 itself (as opposed to the metadata memory 125), to allow access without performing any memory operation.

In some embodiments, the loader 215 may initialize the tag register file 146 in addition to, or instead of, the tag map table 142. For instance, the tag register file 146 may include a plurality of registers corresponding, respectively, to a plurality of entities. The loader 215 may identify, from the initialization specification, metadata associated with the entities, and store the metadata in the respective registers in the tag register file 146.

With reference again to the example of FIG. 1, the loader 215 may, in some embodiments, load policy code (e.g., as output by the policy compiler 220) into the metadata memory 125 for execution by the policy processor 150. Additionally, or alternatively, a separate memory (not shown in FIG. 1) may be provided for use by the policy processor 150, and the loader 215 may load policy code and/or associated data into the separate memory.

In some embodiments, a metadata label may be based on multiple metadata symbols. For instance, an entity may be subject to multiple policies, and may therefore be associated with different metadata symbols corresponding, respectively, to the different policies. The inventors have recognized and appreciated that it may be desirable that a same set of metadata symbols be resolved by the loader 215 to a same binary representation (which is sometimes referred to herein as a "canonical" representation). For instance, a metadata label {A, B, C} and a metadata label {B, A, C} may be resolved by the loader 215 to a same binary representation.

In this manner, metadata labels that are syntactically different but semantically equivalent may have the same binary representation.

The inventors have further recognized and appreciated it may be desirable to ensure that a binary representation of metadata is not duplicated in metadata storage. For instance, as discussed above, the illustrative rule cache 144 in the example of FIG. 1 may map input tags to output tags, and, in some embodiments, the input tags may be metadata memory addresses where binary representations of metadata are stored, as opposed to the binary representations themselves. The inventors have recognized and appreciated that if a same binary representation of metadata is stored at two different metadata memory addresses X and Y, the rule cache 144 may not "recognize" the metadata memory address Y even if the rule cache 144 already stores a mapping for the metadata memory address X. This may result in a large number of unnecessary rule cache misses, which degrades system performance.

Moreover, the inventors have recognized and appreciated that having a one-to-one correspondence between binary representations of metadata and their storage locations may facilitate metadata comparison. For instance, equality between two pieces of metadata may be determined simply by comparing metadata memory addresses, as opposed to comparing binary representations of metadata. This may result in significant performance improvement, especially where the binary representations are large (e.g., many metadata symbols packed into a single metadata label).

Accordingly, in some embodiments, the loader 215 may, prior to storing a binary representation of metadata (e.g., into the metadata memory 125), check if the binary representation of metadata has already been stored. If the binary representation of metadata has already been stored, instead of storing it again at a different storage location, the loader 215 may refer to the existing storage location. Such a check may be done at startup and/or when a program is loaded subsequent to startup (with or without dynamic linking).

Additionally, or alternatively, a similar check may be performed when a binary representation of metadata is created as a result of evaluating one or more policies (e.g., by the illustrative policy processor 150). If the binary representation of metadata has already been stored, a reference to the existing storage location may be used (e.g., installed in the illustrative rule cache 144).

In some embodiments, the loader 215 may create a hash table mapping hash values to storage locations. Before storing a binary representation of metadata, the loader 215 may use a hash function to reduce the binary representation of metadata into a hash value, and check if the hash table already contains an entry associated with the hash value. If so, the loader 215 may determine that the binary representation of metadata has already been stored, and may retrieve, from the entry, information relating to the binary representation of metadata (e.g., a pointer to the binary representation of metadata, or a pointer to that pointer). If the hash table does not already contain an entry associated with the hash value, the loader 215 may store the binary representation of metadata (e.g., to a register or a location in a metadata memory), create a new entry in the hash table in association with the hash value, and store appropriate information in the new entry (e.g., a register identifier, a pointer to the binary representation of metadata in the metadata memory, a pointer to that pointer, etc.). However, it should be appreciated that aspects of the present disclosure are not limited to the use of a hash table for keeping track of binary representations of metadata that have already been stored.

Additionally, or alternatively, other data structures may be used, such as a graph data structure, an ordered list, an unordered list, etc. Any suitable data structure or combination of data structures may be selected based on any suitable criterion or combination of criteria, such as access time, memory usage, etc.

It should be appreciated that the techniques introduced above and discussed in greater detail below may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the present disclosure are not limited to the use of any particular technique or combination of techniques.

For instance, while examples are discussed herein that include a compiler (e.g., the illustrative compiler 205 and/or the illustrative policy compiler 220 in the example of FIG. 2), it should be appreciated that aspects of the present disclosure are not so limited. In some embodiments, a software toolchain may be implemented as an interpreter. For example, a lazy initialization scheme may be implemented, where one or more default symbols (e.g., "UNINITIALIZED") may be used for tagging at startup, and a policy processor (e.g., the illustrative policy processor 150 in the example of FIG. 1) may evaluate one or more policies and resolve the one or more default symbols in a just-in-time manner.

The inventors have recognized and appreciated that effectiveness of security policies may depend on proper tagging when a target system is booted and/or when an application is loaded into memory for execution. Accordingly, techniques are described herein for describing and realizing initial configurations that are secure.

In some embodiments, a policy language may be provided for describing associations between metadata symbols and various entities across a runtime system, such as hardware entities and/or software entities. For instance, the policy language may be used to write a policy that maps entity names to metadata symbols.

In some embodiments, entity names may simply identify system components such as local memory, off-chip memory, processor register file, etc. Implementation details for these components may be provided in a target description. For instance, a target description for a particular target system may provide implementation details of that target system, such as a size of a register file, an index number of a configuration register, and/or an address range of a piece of software code to be loaded into memory. In this manner, a policy that maps entity names to metadata symbols may be readily re-used across different target systems (e.g., by combining the policy with different target descriptions).

The inventors have further recognized and appreciated that if an attacker is able to take control of a loader program, the attacker may be able to thwart security policies by using the loader program's capabilities to modify metadata and/or policy code. Accordingly, in some embodiments, a policy may be provided to secure the loader program.

FIG. 3 shows an illustrative policy 300 for securing a loader program, in accordance with some embodiments. For instance, the policy 300 may be written in a policy language, and may be used to secure the illustrative loader 215 in the example of FIG. 2.

In the example of FIG. 3, the policy 300 includes a plurality of sections. Section 305 may declare one or more metadata symbols, section 310 may declare one or more rules that reference one or more metadata symbols declared in the section 305, and section 315 may map one or more entity names to one or more metadata symbols declared in the section 305.

In some embodiments, given a type of an instruction (e.g., an opcode) and one or more input metadata symbols associated with the instruction, a rule may indicate whether the instruction should be allowed. Additionally, or alternatively, the rule may indicate one or more output metadata symbols. For instance, the rule may indicate one or more output metadata symbols to be associated with a result of executing the instruction, if the instruction is to be allowed.

In some embodiments, one or more rules may be applied to a loader program that loads data and/or instructions into an application memory, and/or initializes corresponding metadata in a metadata memory. As one example, one or more rules may be provided to facilitate creation of metadata tags and/or association of the tags with the data and/or instructions being loaded into the application memory. As another example, one or more rules may be provided to protect the loader from attack and misuse. For instance, loader code may be associated with a designated metadata tag (e.g., "LoaderAllow"). Instructions without that tag may be prohibited from accessing one or more memory regions associated with the loader.

In some embodiments, a region of an application memory, referred to herein as a "metadata palette," may be allocated for use in creating metadata tags. This region may be like an artist's palette having a plurality of primary colors to be mixed together in any suitable combination. For instance, each word stored in the metadata palette in the application memory 120 may be a zero (or some other default value), and the memory location of the word may be associated with a primitive metadata tag in the metadata memory 125. Each primitive metadata tag may correspond to a metadata symbol referenced by a policy (e.g., "Read," "Write," "Execute," "LoaderAllow," "LoaderCompose," "LoaderApply," "loadGrp," "storeGrp," "composeGrp," etc.). Additionally, or alternatively, the memory location of the word may be associated with a designated metadata tag (e.g., "MetadataPalette") to indicate the location is within the metadata palette region.

In some embodiments, to construct a composite metadata tag from two primitive tags, the loader may be programmed to read values stored in two metadata palette locations corresponding respectively to the two primitive tags, and perform a first operation on those values. Reading from a metadata palette location may cause a rule associated with the read to be evaluated, which may remove the "MetadataPalette" tag. For instance, a register storing a value read from a location tagged with {MetadataPalette, A} may be tagged with {A}.

In some embodiments, the values read from the two metadata palette locations may be zeros, the first operation may be bitwise OR, so that a result of the first operation is also zero. Such a "dummy" operation may cause a rule associated with the first operation to be evaluated, which may result in creation of a new tag and association of the new tag with a register storing the result. For example, composing {A} and {B} may result in the register being tagged with {A, B}.

In some embodiments, the loader may perform a second operation on the result of the first operation and a value read from an application memory location to be tagged with a composite tag, and write a result of the second operation back into the application memory location to be tagged. For instance, the second operation may also be bitwise OR, so that the result of the second operation is the same as the value read from an application memory location to be tagged. Again, although the second operation is a "dummy," performing the second operation may cause a rule associated with the second operation to be evaluated, which may tag a register storing the result of the second operation with the composite tag (e.g., {A, B}). Writing that result back to memory may cause a rule associated with the write to be evaluated, which may tag the application memory location with the composite tag (e.g., {A, B}).

Returning to the example of FIG. 3, the section 310 of the policy 300 includes five rules to be applied in the order shown.

A rule at line 9 indicates that a load instruction with the "LoaderAllow" tag is allowed to read a memory location with the "MetadataPalette" tag. When the memory location is read, a register storing a value read from the memory location may have the same tag(s) as the memory location, except the "MetadataPalette" tag is removed.

A rule at line 10 indicates that a store instruction with the "LoaderAllow" tag is allowed to write any value stored in a register to any location in memory. The memory location to which the value is written is associated with the same tag as the register storing the value.

A rule at line 11 indicates that a load instruction that does not have the "LoaderAllow" tag[1] is not allowed to read any memory location with the "MetadataPalette" tag.

A rule at line 12 indicates that a store instruction that does not have the "LoaderAllow" tag[2] is not allowed to write any memory location with the "MetadataPalette" tag.

[1]In this example, line 11 is reached only if line 9 does not apply.
[2]In this example, line 12 is reached only if line 10 does not apply.

A rule at line 13 indicates that a result of a compose instruction has a set of one or more tags that is a union of two sets, namely, a first set of one or more tags of the first operand and a second set of one or more tags of the second operand.

In some embodiments, certain instruction types (e.g., opcodes) may be considered sufficiently similar to each other, and therefore may be grouped together for purposes of enforcing policies. For instance, line 9 of the policy 300 may be triggered on any instruction type in a group called "loadGrp," line 10 of the policy 300 may be triggered on any instruction type in a group called "storeGrp," etc.

In some embodiments, a policy language may have a group specification section that allows a user to define any desirable grouping of any one or more instructions. A policy linker (e.g., the illustrative policy linker 225 in the example of FIG. 2) may be programmed to match instructions encountered when processing object code to one or more groups indicated in an initialization specification produced by a policy compiler. The policy linker 225 may then annotate the instructions with metadata labels that indicate the respective groups to which the instructions belong. In this manner, the policy compiler may be ISA-agnostic, leaving the ISA-dependent matching to the policy linker.

The following is an illustrative grouping of some instruction types in a RISC-V instruction set architecture. It should be appreciated that these opcodes and opcode groups are provided solely for purposes of illustration. Aspects of the present disclosure are not limited to the use of any particular ISA, or any particular grouping of opcodes.

branchGrp(RS1: op1, RS2: op2→)
    beq, bne, blt, bge, bltu, bgeu
immArithGrp(RS1: op1→RD:res)
    addi, slli, slti, sltiu, xori, srli, srai, ori, andi, addiw, slliw, srliw, sraiw, arithGrp(RS1:op1, RS2:op2→RD:res)
    add, sub, sll, slt, sltu, xor, srl, sra, or, and, addw, subw, sllw, srlw, sraw
loadGrp(RS1:addr, MEM:mem→RD:res)
    lb, lh, lw, ld, lbu, lhu, lwu
storeGrp(RS1:addr, RS2:val, MEM:mem→MEM:mem)
    sb, sh, sw, sd FIG. 4 shows illustrative policy code 400 output by a policy compiler, in accordance with some embodiments. For instance, the policy code 400 may be a result of compiling, by the illustrative policy compiler 220 in the example of FIG. 2, line 12 of the illustrative policy 300 shown in FIG. 3.

In the example of FIG. 4, line 405 of the policy code 400 may check if an input instruction is a store instruction, for example, by checking whether the instruction has associated therewith a metadata label, "og_dover_riscv_storeGrp," which may indicate whether the instruction belongs to a group of store instructions. Additionally, or alternatively, a hardware block may be provided to classify instructions into groups such as store, load, arithmetic, branch, etc.

In some embodiments, line 410 of the policy code 400 may check if the input instruction is attempting to access a memory location associated with the "MetadataPalette" tag. If so, a failure may be returned explicitly. Otherwise, an implicit failure may be returned, which may cause evaluation of a next rule (e.g., line 13 in FIG. 3).

It should be appreciated that aspects of the present disclosure are not limited to implementing a policy by compiling the policy into policy code. Additionally, or alternatively, a policy may be implemented by programming an FPGA, and/or loading rules directly into a rule cache (as opposed to loading rules into the rule cache as a result of policy code execution).

Returning to the example of FIG. 3, section 315 of the policy 300 includes a plurality of statements, each statement mapping an entity name to one or more metadata symbols. As explained below, a policy linker (e.g., the illustrative policy linker 225 in the example of FIG. 2.) may match an entity name in such a statement to an entity representing a system component to be protected, such as a function of a loader program of an operating system. A keyword (e.g., "init") may be used to indicate that the entity denoted by the entity name is to be initialized with one or more metadata symbols that follow the entity name. For example, line 16 may indicate an entity having the name "dover.Kernel.Code.ApplyTag.apply_tags_load_taga" is to be initialized with the metadata symbol "LoaderAllow."

Figure 5:
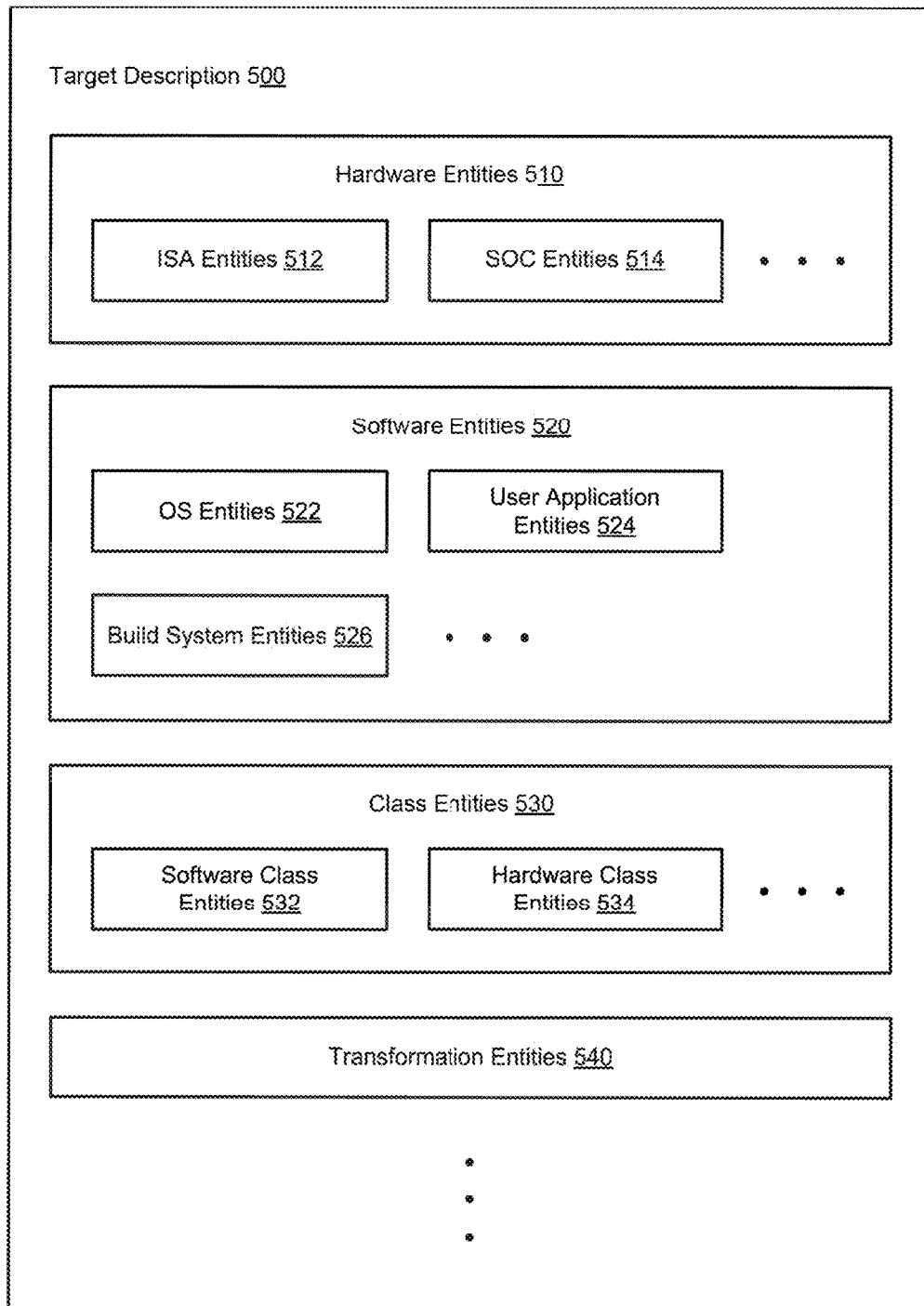
FIG. 5 shows, schematically, an illustrative target description 500, in accordance with some embodiments.

As discussed above, entity names may, in some embodiments, simply identify system components such as local memory, off-chip memory, processor register file, etc. Given a particular target system to be secured, implementation details for one or more components of that target system may be provided in a target description. The target description may be used by a policy linker (e.g., the illustrative policy linker 225 in the example of FIG. 2.) to annotate object code with metadata symbols. FIG. 5 shows, schematically, an illustrative target description 500, in accordance with some embodiments.

In some embodiments, the target description 500 may include descriptions of a plurality of named entities that correspond, respectively, to a plurality of components of the target system. The entity descriptions may be organized into a plurality of modules. For instance, in the example shown in FIG. 5, the target description 500 includes a hardware entities module 510, a software entities module 520, a class entities module 530, a transformation entities module 540, etc. Some modules may include a plurality of submodules. For example, the hardware entities module 510 may include an ISA entities module 512, a system on chip (SOC) entities module 514, etc., the software entities module 520 may include an OS entities module 522, a user application entities module 524, a build system entities module 526, etc., and the class entities module 530 may include a software class entities module 532, a hardware class entities module 534, etc.

In some embodiments, various modules may be selected and combined to describe different target systems. For instance, a plurality of different ISA entities modules may be available, corresponding respectively to different ISAs. Similarly, a plurality of different OS entities modules may be available, corresponding respectively to different operating systems. Given a particular target system, an appropriate ISA entities module may be selected from the available ISA entities modules, and an appropriate OS entities module may be selected from the available OS entities modules. The selected modules may then be combined into a target description for that particular target system. In this manner, entity descriptions prepared for one target system may be readily re-used for another target system.

A named entity may represent any aspect of a target system's hardware and/or software. Non-limiting examples of entities are provided below.

In some embodiments, the hardware entities module 510 may describe one or more state elements on a chip for which metadata is to be initialized at startup. Examples of such state elements include, but are not limited to, the following.

The ISA entities module 512 may include one or more entities based on an instruction set architecture of the target system. Such entities may represent aspects of hardware implementation that have state information to be protected, such as configuration registers, program counter, register file, timers, status flags, etc.

The SOC entities module 514 may include one or more entities representing chip-level features that have state information to be protected, such as on-chip memories, configuration registers, functional blocks, memory transfer units, I/O devices, etc.

In some embodiments, the software entities module 520 may describe one or more state elements related to runtime software for which metadata is to be initialized at startup. Examples of such state elements include, but are not limited to, the following.

The OS entities module 522 may include one or more entities representing operating system features, such as functions, modules, drivers, service routines, etc.

The user application entities module 524 may include one or more entities, such as functions, modules, drivers, service routines, etc.

The build system entities module 526 may include one or more entities representing build system features having machine loadable data, such as Executable and Linkable Format (ELF) files having an executable code section (e.g., .text), an initialized data section (.data), etc.

The inventors have recognized and appreciated that it may be beneficial to group together certain hardware features and/or software features into a class for tagging purposes. For instance, during initialization, all hardware features and/or software features in a class may be associated with a same set of one or more metadata symbols. Any suitable criterion or combination of criteria may be used to define a class entity. In some embodiments, the class entities module 530 may include the following non-limiting examples of class entities.

The software class entities module 532 may include one or more entities representing, respectively, all functions, all functions having a name matching a certain regular expression, all software entities residing in a certain memory range, etc.

The hardware class entities module 534 may include one or more entities representing, respectively, all registers, all registers having a name matching a certain regular expression, all registers of a certain type (e.g., all configuration registers), all registers in a certain address range, etc.

An entity representing all hardware features and software features satisfying a certain criterion, such as having a name that begins with a certain prefix.

An entity representing all hardware features and/or software features that are relevant for enforcing a particular policy.

In some embodiments, a class entity may be elaborated into multiple entities by a policy linker (e.g., the illustrative policy linker 225 in the example of FIG. 2). As one example, a class entity expression may represent a register file with 32 entries, and the policy linker 225 may evaluate the expression into 32 expressions, each representing a respective register. As another example, a class entity expression may represent eight configuration registers, comprising two configuration registers for each of four processor modes, aligned on 16-byte boundaries starting at a certain address (e.g., 0x1fc000). The policy linker 225 may evaluate the expression into eight expressions, each representing a respective configuration register at an appropriate address (e.g., an offset of some suitable multiple of 16 bytes from the starting address). Thus, class entities may be used to describe repeating structures in a target system in a compact manner. As another example, a class entity expression may include a description of a pattern (e.g., all functions that belong to a particular library, all universal asynchronous receiver-transmitter (UART) devices that are enumerated on a chip, etc.). The policy linker 225 may find all entities of the target system that match the pattern in the class entity expression.

In the example shown in FIG. 5, the transformation entities module 540 of the target description 500 includes one or more entities representing one or more transformations that may be applied to software code before or during compilation to facilitate enforcement of one of more policies. For example, a policy may indicate that a certain condition relating to metadata should be satisfied before a piece of code is executed. To comply with the policy, one or more instructions may be prepended to the piece of code (e.g., through compiler modification and/or application binary rewriting). The one or more prepended instructions may be designed to cause no change in any application data (e.g., a NOP instruction, or a logical OR operation applied to an input word and the constant 0, thereby returning the input word itself). However, execution of the one or more prepended instructions may cause one or more rules to be evaluated (e.g., by the illustrative tag processing hardware 140), thereby effecting one or more changes in metadata to satisfy the condition set by the policy.

Although examples of modules of named entities are shown in FIG. 5 and discussed herein, it should be appreciated that aspects of the present disclosure are not limited to the use of any particular module, or any module at all. Also, it should be appreciated that a target description may be created in any suitable manner. As an example, an entity may be defined by a user. As another example, a software tool may be provided to automatically parse a hardware specification and extract hardware entities (e.g., program counter, configuration registers, etc.). Additionally, or alternatively, a software tool may be provided to automatically parse software source code and extract software entities (e.g., named function entities, variable entities, etc.). As another example, one or more entities may be defined by compilation, linking, and/or loading processes (e.g., runtime stacks and heaps, elf sections, etc.), and/or other analysis tools (e.g., flow graphs).

In some embodiments, a hierarchical namespace may be used to provide entity names, so that each entity may be uniquely identified. This may facilitate mapping from entity names to metadata symbols (e.g., as shown in section 315 of the illustrative policy 300 in the example of FIG. 3). Examples of hierarchical entities names are provided below.

ISA entities
        dover.riscv.User.PC
        dover.riscv.User.Reg
    SOC entities
        dover.SOC.IO.Flash
        dover.SOC.CSR.MTVec
    OS entities
        dover.Kernel.MemoryMap.UserStack
        dover.Kernel.MemoryMap.UserHeap
        dover.Kernel.MemoryMap.Default
        dover.Kernel.Code.ElfSection.SHF_WRITE
        dover.Kernel.Code.ElfSection.SHF_ALLOC
        dover.Kernel.Code.ApplyTag.my_function
    Run Time Library entities
        dover.Tools.RTL.memcpy In some embodiments, a named entity in a target description may have one or more associated named properties that describe the entity as realized in hardware. Such information may be used by a policy linker and/or a loader (e.g., the illustrative policy linker 225 and/or loader 215 in the example of FIG. 2) to securely initialize a target system.

In some embodiments, a software tool may be provided to automatically parse a hardware specification and extract information regarding one or more hardware entities (e.g., a size of a register file, an index number of a configuration register, etc.). The extracted information may be included in a target description, for instance, as one or more properties associated with the one or more hardware entities.

In some embodiments, software entities may represent units of code and/or data to be loaded into memory. A software tool may be provided to automatically analyze software code (e.g., source code and/or object code) and extract information regarding one or more software entities. The extracted information may be included in a target description, for instance, as one or more properties associated with the one or more software entities. As an example, a property describing a software entity may include an address range where the code and/or data of the software entity reside. Such an address range may be provided in terms of offsets, which may be used to determine absolute memory addresses when the code and/or data are actually loaded into memory (e.g., by the illustrative loader 215 in the example of FIG. 2).

Additionally, or alternatively, properties of one or more software entities may be extracted from one or more build process symbol tables, and/or using one or more binary analysis tools, code profiling tools, and/or compiler-based code analysis tools.

As discussed above (e.g., in connection with the example of FIG. 3), a policy may, in some embodiments, map entity names to corresponding metadata symbols via "init" statements. A policy linker (e.g., the illustrative policy linker 225 in the example of FIG. 2) may be programmed to search a target description to identify entities having the entity names mentioned in the policy. For instance, for each "init" statement in the policy, the policy linker 225 may match the entity name in the "init" statement to an entity in the target description. If no matching entity is found, the policy linker 225 may output an error message. If a matching entity is found, the policy linker 225 may bind the "init" statement to the entity. Additionally, or alternatively, the policy linker 225 may identify a description of the entity from the target description, and may use the description to annotate object code corresponding to the entity with one or more metadata symbols from the "init" statement.

In some embodiments, the policy linker 225 may format an initialization specification into a form suitable for use by the loader 215. For instance, the initialization specification may be formatted to go into one or more binary files so as to flow through a back-end build process to the loader 215. However, that is not required, as in some embodiments the initialization specification may be provided to the loader 215 separately.

With reference again to the example of FIG. 2, the policy linker 225 may, in some embodiments, associate metadata labels with instructions and/or data in an object code file output by the compiler 205. (As discussed above, a metadata label may provide a compact encoding of a set of one or more metadata symbols referenced by one or more policies.) The association of metadata labels with instructions and/or data may be done in any suitable way. For instance, an ELF format may allow creation of a new section within an object file to hold arbitrarily formatted data. A section for metadata may be added in the object file, and each code or data word in the object file may have a corresponding metadata label in the metadata section. In this manner, metadata annotations made by the policy linker 225 may be passed through and aggregated by the linker 210. Additionally, or alternatively, the policy linker 225 may associate metadata labels with instructions and/or data in an object code file output by the compiler 205.

In some embodiments, the policy linker 225 may use one or more "init" statements (which map entity names to corresponding metadata symbols) in a policy, one or more groupings of instructions indicated in the policy (e.g., in a group specification section), and/or one or more entity descriptions in a target specification to create metadata labels for instructions and/or data in an object code file. For instance, the policy linker 225 may identify entity names from the policy's "init" statements and use the entity names to look up entity descriptions in the target description. The policy linker 225 may then use the entity descriptions to locate elements in the object code file, and associate appropriate metadata labels with the instructions and/or data in the object code file.

FIG. 6 shows illustrative assembly code 600 that has been annotated with metadata labels, in accordance with some embodiments. For instance, the assembly code 600 may be generated by disassembling object code annotated with metadata labels (e.g., an object code file with an added metadata section). Because such object code may not be human readable, the assembly code 600 is provided herein to illustrate various concepts relating to annotating object code with metadata labels. Moreover, as discussed above, a debugging tool (e.g., the illustrative debugger 230 shown in FIG. 2) may display human readable assembly code generated by disassembling object code annotated with metadata labels.

In the example of FIG. 6, the assembly code 600 includes a plurality of lines corresponding, respectively, to a plurality of instructions. A plurality of markers may be inserted into the assembly code 600 to mark locations where certain functions begin. For instance, a marker 605 may be inserted to indicate where an "apply_md" function begins, a marker 610 may be inserted to indicate where an "apply_md_compose_loop" function begins, and a marker 615 may be inserted to indicate where an "apply_md_write_mem" function begins.

In some embodiments, each line in the assembly code 600 may include a plurality of columns. For instance, the assembly code 600 may be generated from an excerpt of an object file, and a leftmost column may include an address (e.g., "424" as shown at 620 in FIG. 6) that is an offset from a beginning of the object file. Next three columns may include, respectively, a code word, a mnemonic, and one or more parameters of an instruction (e.g., "0002a783," "lw," and "a5, 0 (t0)" as shown at 625, 630, and 635 in FIG. 6). A rightmost column may include a metadata label applied to the instruction by a policy linker (e.g., the illustrative policy linker 225 in the example of FIG. 2).

In some embodiments, a metadata label applied by a policy linker may be based on a metadata symbol declared in a policy. For instance, with reference to the example of FIG. 3, the metadata symbol "LoaderAllow" is declared in the illustrative policy 300. The policy compiler 220 may construct a hierarchical metadata label from the metadata symbol "LoaderAllow," for example, by adding a prefix to indicate a policy name (e.g., "dover.loader").

Referring again to the example of FIG. 3, an "init" statement in the policy 300 maps the entity name "dover.Kernel.Code.ApplyTag.apply_tags_load_taga" to the metadata symbol "LoaderAllow." The policy linker 225 may match the name "dover.Kernel.Code.ApplyTag.apply_tags_load_taga" to an entity and a corresponding description in a target description, and may use the description to identify one or more instructions in the object code to be annotated with the metadata symbol "LoaderAllow." As one example, the entity description may indicate that instructions residing in the address range 0000 0424 to 0000 042f are associated with the entity to which the name "dover.Kernel.Code.ApplyTag.apply_tags_load_taga" is bound. As another example, the entity description may indicate that instructions between the marker <apply_md> and the next marker are associated with the entity to which the name "dover.Kernel.Code.ApplyTag.apply_tags_load_taga" is bound. The policy linker 225 may look up the marker <apply_md> in a software library (e.g., as produced by the illustrative compiler 205 and/or linker 210 in the example of FIG. 2) to identify the address range 0000 0424 to 0000 042f. The policy linker 225 may then analyze instructions found in that range to determine if the instructions should be annotated with additional metadata. For example, one or more instructions may be part of a function prologue or a function epilogue, and as such should be annotated with metadata symbols for a stack policy.

In some embodiments, a metadata label may be based on a plurality of metadata symbols declared in different policies. For example, an entity may be subject to multiple different policies and therefore referenced in multiple different "init" statements. Nevertheless, a single metadata label may be applied to the entity, and may be subsequently resolved into a binary representation (e.g., a canonical representation, as discussed above). In this manner, only one metadata memory address may be maintained, even if the entity is to be associated with multiple metadata symbols. This may reduce a size of a tag map table (e.g., the illustrative tag map table 142 in the example of FIG. 1) and/or processing time (e.g., by the tag processing hardware 140 in the example of FIG. 1).

In some embodiments, an amount of metadata memory used to store a collection of binary representations of metadata labels may be reduced by constructing a table of binary representations of metadata labels that are actually used. Instead of storing the collection of binary representations, a collection of indices into that table may be stored.

The inventors have recognized and appreciated that it may be desirable to associate metadata symbols with instructions judiciously, for example, to reduce an amount of storage used for metadata and/or to speed up metadata processing. Accordingly, in some embodiments, a policy linker 225 may be programmed to identify instructions that would trigger one or more rules referencing a metadata symbol, and to apply a corresponding metadata label to those instructions only. For instance, with reference to the example of FIG. 3, the metadata symbol "LoaderAllow" is referenced in the rules at lines 9 and 10, and those rules are triggered by instructions in groups "loadGrp" and "storeGrp," respectively. Therefore, the metadata symbol "LoaderAllow" is associated with the load instruction at address 000 0424, but not with the arithmetic instruction at address 0000 0428, or the branching instruction at address 0000 042c, even though the arithmetic instruction and the branching instruction are part of a same software entity as the load instruction (namely, the "apply_md" function).

Figure 7:
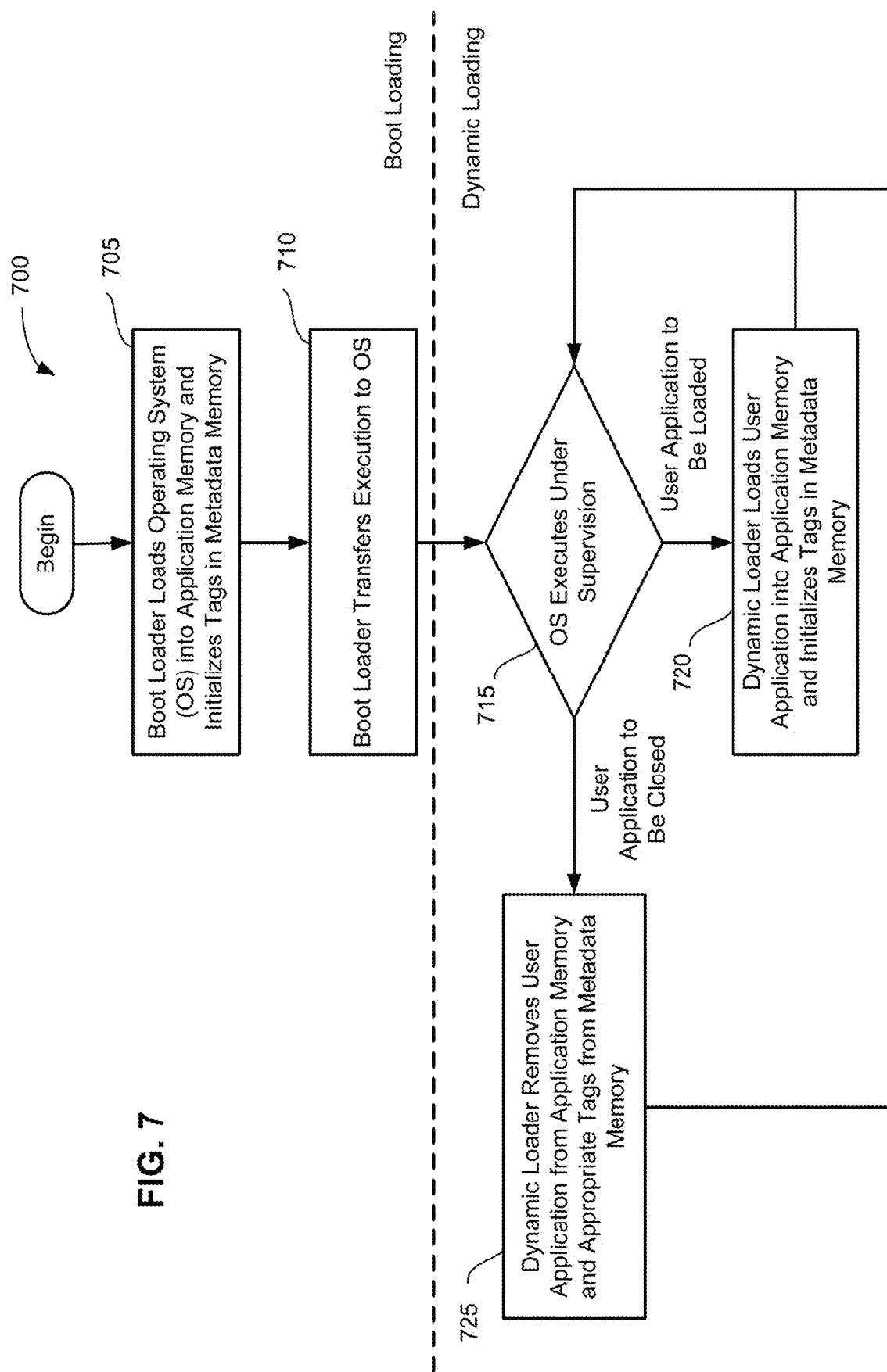
FIG. 7 shows an illustrative process 700 for loading executable code in a computer system, in accordance with some embodiments.

FIG. 7 shows an illustrative process 700 for loading executable code in a computer system, in accordance with some embodiments. For instance, with reference to the example of FIG. 2, the process 700 may be performed by the loader 215 to load data and/or instructions into the application memory 120, and/or initialize tags in the metadata memory 125 for the data and/or instructions.

In the example of FIG. 7, the process 700 includes two stages, boot loading and dynamic loading. One or both of these stages may be performed by the loader 215 in the example of FIG. 2. For instance, the loader 215 may include a boot loader and a dynamic loader. In some embodiments, the dynamic loader may be part of an operating system. However, it should be appreciated that aspects of the present disclosure are not limited to having a dynamic loader that is part of an operating system.

In some embodiments, the boot loader and the dynamic loader may be executed by physically separate processors. For instance, the boot loader may be executed by the illustrative policy processor 150 in the example of FIG. 1, while the dynamic loader may be executed by the illustrative host processor 110. However, it should be appreciated that aspects of the present disclosure are not limited to executing the boot loader and the dynamic loader on separate processors. In some embodiments, both the boot loader and the dynamic loader may execute on a same processor (e.g., the policy processor 150 or the host processor 110).

The inventors have recognized an appreciated that having separate machine state for loader code, for example, by loading the loader code into a memory separate from an application memory and/or using a separate set of registers for executing the loader code, may make it more difficult for an attacker to gain access to, or modify, metadata. For instance, having separate machine state may make it more difficult for an attacker to take control over the loader code. However, it should be appreciated that aspects of the present disclosure are not limited to executing loader code on the policy processor 150 as opposed to the host process 110. In some embodiments, the boot loader and/or the dynamic loader may execute on the host processor 110, and may be secured by a loader policy (e.g., the illustrative policy 300 shown in FIG. 3).

In some embodiments, a loader policy may restrict a privilege of modifying metadata to loader code executing in a correct context. As one example, the loader policy may include one or more rules indicating that only legitimate binary images may be loaded, such as binary data associated with a metadata symbol proving the binary data is from a valid source. This metadata symbol may have been attached to the binary data by another process that has verified the binary data's integrity and/or authenticity (e.g., based on a cryptographic digital signature). As another example, the loader policy may include one or more rules that enforce control flow integrity, such that program execution may only transfer from a specific point in OS code to loader code. In this manner, the loader policy may prevent malicious attacker code from loading an illegitimate binary image.

Additionally, or alternatively, a loader policy may include one or more rules such as loader code may not be modified or copied, loader instructions may execute only in a proper sequence, etc.

Returning to FIG. 7, the boot loader may, at act 705, load a binary image of an operating system into the application memory 120. Additionally, or alternatively, the boot loader may initialize tags in the metadata memory 125 according to an initialization specification for the OS. The OS binary image and/or the OS metadata initialization specification may be retrieved from persistent storage (e.g., flash memory, hard disk, ROM, etc.). As discussed above, the OS metadata initialization specification may be produced by a policy linker (e.g., the illustrative policy linker 225 in the example of FIG. 2) based on the OS binary image, compiled code for one or more policies applicable to the OS (e.g., a dynamic loader policy), and/or a target description.

In some embodiments, the OS binary image and/or the OS metadata initialization specification may be electronically signed, and may be distributed with a public key corresponding to a private key used for signing. The private key itself may not be distributed. The boot loader may use the public key to verify that the OS binary image and/or the OS metadata initialization specification have not been modified.

At act 710, the boot loader may transfer execution to the OS, which may complete the boot loading stage and commence the dynamic loading stage. At act 715, the OS may execute under supervision of policy enforcement hardware, such as the illustrative write interlock 112, the illustrative tag processing hardware 140, the illustrative policy processor 150, and/or the illustrative metadata memory 125 in the example of FIG. 1.

In the example shown in FIG. 7, the OS includes the dynamic loader. At act 720, the dynamic loader may load a binary image of a user application into the application memory 120, for example, in response to a user launching the user application. Additionally, or alternatively, the dynamic loader may initialize tags in the metadata memory 125 according to an initialization specification for the user application. The user application binary image and/or the user application metadata initialization specification may be retrieved from persistent storage (e.g., flash memory, hard disk, ROM, etc.). As discussed above, the user application metadata initialization specification may be produced by a policy linker (e.g., the illustrative policy linker 225 in the example of FIG. 2) based on the user application binary image, compiled code for one or more policies applicable to the user application, and/or the target description.

In some embodiments, the dynamic loader may initialize tags in the metadata memory 125 by triggering one or more rules of a loader policy, such as the illustrative loader policy 300 in the example of FIG. 3. For instance, the dynamic loader may perform certain operations on a metadata palette region in the application memory 120, as discussed above in connection with FIG. 3. This may trigger evaluation of one or more rules of the loader policy 300 by the processing hardware 140 and/or the policy processor 150, thereby creating and applying composite tags.

In some embodiments, the user application binary image and/or the user application metadata initialization specification may be electronically signed, and may be distributed with a public key corresponding to a private key used for signing. The private key itself may not be distributed. The dynamic loader may use the public key to verify that the user application binary image and/or the user application metadata initialization specification have not be modified. Additionally, or alternatively, loading the user application binary image using the user application metadata initialization specification may trigger one or more loader policy rules. For instance, the one or more rules, when evaluated, may look for one or more metadata symbols proving the user application binary image and/or the user application metadata initialization specification are from a valid source. The one or more metadata symbols may have been attached to the user application binary image and/or the user application metadata initialization specification by another process that has performed a verification using the public key.

Since the OS and the user application may be distributed by different vendors, the public-private key pairs used to sign and verify the OS and the user application may be different.

In some embodiments, once loaded and tagged, the user application may execute under supervision of policy enforcement hardware (e.g., the illustrative write interlock 112, the illustrative tag processing hardware 140, the illustrative policy processor 150, and/or the illustrative metadata memory 125 in the example of FIG. 1).

In some embodiments, the dynamic loader may also handle teardown and cleanup of terminated applications. For instance, at act 725, the dynamic loader may remove the binary image of the user application from the application memory 120 in response to a user closing the user application or shutting down the computer system. In some embodiments, removing the binary image of the user application may trigger evaluation of one or more loader policy rules by the processing hardware 140 and/or the policy processor 150, which may cause removal of all entries in the tag map table 142 that are related to the user application being closed, and/or corresponding metadata from the metadata memory 125 and/or the tag register file 146. In some embodiments, where a same tag may be associated with different user applications, metadata that is no longer referenced anywhere in the tag map table 142 may be removed.

Illustrative Policies
Integrity Policy

In some embodiments, an integrity policy may use information flow to track where data has come from. For instance, a data source such as a serial port, an Ethernet port, a memory, ROM, etc. may be marked with a metadata tag identifying the data source. During transfers, the data and any derived data may retain the tag for the data source.

In some embodiments, policy rules may indicate what uses of tracked information are allowed. For instance, an integrity policy may prohibit any control flow decision from being made using data that has come from an off-chip source, thus preventing Data Oriented Programming (DOP) attacks.

In some embodiments, data that is tracked may be marked with a metadata tag indicating the data's source. As a program executes and manipulates the data, the source tag may be propagated through computations so that any derived data retains the source indication marking.

In some embodiments, an integrity policy may track information flow to restrict transmission of data, for instance, to prevent certain data from leaving a System on Chip (SoC).

In some embodiments, an integrity policy may check integrity for DOP protection.

In some embodiments, an integrity policy may detect and/or prevent modification of certain data, e.g., secure firmware update.

Safety Policy

In some embodiments, a safety policy may maintain metadata to enforce one or more temporal system properties, such as ordering and protocol state transitions. For instance, using policies, a sequencing of events may be monitored and checked against a reference state machine.

In some embodiments, one or more sections of system code may be marked with metadata indicating state transitions. A program counter (or another suitable entity) may be marked with environment metadata, which may carry system state variables. One or more safety policies may use the transitions to update the state variables, and to check for valid transitions.

Context Switch Policy

In some embodiments, a context switch policy may allow privileged code in an OS to perform a context switch operation to move between different tasks or process contexts. A process of switching contexts may involve saving old task data (e.g., task data associated with a context being exited) to, and/or loading new task data (e.g., task data associated with a context being entered) from, kernel storage. The inventors have recognized and appreciated that loading of new task data and/or saving of old task data may violate one or more security properties of policies that are in effect. Accordingly, in some embodiments, a context switch policy may be provided to override the other policies to allow context switching to take place.

In some embodiments, a context switch policy may check that metadata on code being executed is from an OS context switch routine for changing between tasks. The context switch policy may override other policies in place, and may allow the code from the OS context switch routine to save task data to kernel memory, and/or restore task data from kernel memory, along with respective metadata for the tasks.

The inventors have recognized and appreciated that, in some instances, code associated with one task may not be allowed to manipulate state associated with another task. Accordingly, in some embodiments, a context switch policy may use a special global keyword in the policy language to allow context switch code to operate on data that is associated, via metadata, with more than one task (e.g., the task being paused and the context switch task itself, or the task being resumed and the context switch task itself).

Compartment Policy

In some embodiments, a compartment policy may provide isolation and/or control of information flow between tasks. Such compartmentalization may be used, for example, for a software fault isolation scheme, where a compromised compartment may be prevented from accessing or damaging other compartments.

In some embodiments, a compartment policy may assign colors to each compartment and check that metadata for machine operations always have consistent compartment colors. For instance, compartment color metadata may be applied to task data, task environment, and/or task code. This may associate data and code with an execution context. In some embodiments, a compartment model may have one or more mechanisms for switching between tasks, such as a real time operating system (RTOS) context switch. Additionally, or alternatively, a compartment policy may specify information flows between compartments that are allowed to enable communication between compartments.

In some embodiments, a compartment policy may provide explicit policy control of flows between compartments. For instance, a compartment policy may, during execution, enforce that compartment A is allowed to share information with compartment B.

In some embodiments, a compartment policy may provide generalized declassification of data. For instance, a compartment policy may, during execution, enforce that a certain type of data is allowed to leave a compartment.

In some embodiments, a compartment policy may associate compartments with RTOS tasks. For instance, a compartment policy may assign a selected region of memory to be used as a first-in, first-out (FIFO) buffer for data to be transferred from compartment A to compartment B.

In some embodiments, a compartment policy may provide logical isolation of execution environments running on a single processor. For instance, a compartment may include a complete execution context, which may include code and data in memory, hardware registers and a designated environment (or program counter, pc) register for holding a context identifier (e.g., metadata ID). A compartment policy may include rules that ensure all parts (e.g., code, data, registers, etc.) of the execution context share a single common metadata ID that identifies the compartment. Execution within the compartment may proceed as normal within each separate compartment. However, code in one compartment may not be allowed to interact with data from another compartment unless explicitly allowed by a rule.

In some embodiments, a compartment policy may, during execution, enforce that input data for a computation may only belong to an active compartment, and/or that a result of the computation may be labeled with an ID of the active compartment. Similarly, store/load operations to/from memory may only occur when the memory is labeled with the appropriate compartment ID.

In some embodiments, a multitasking environment may be provided where a compartment may be associated with a certain task when the task is created. Whenever the OS switches between tasks, the compartment ID may be changed to match the new compartment. FIG. 8 shows an illustrative compartment policy 800, in accordance with some embodiments. In this example, rules are provided, respectively, for a plurality of operation types. Each rule may, when executed, enforce that an operation of a corresponding type may proceed only if all inputs and outputs have identical compartment IDs.

FIG. 9 shows illustrative policy code 900 that may be generated by a policy compiler (e.g., the illustrative policy compiler 220 in the example of FIG. 2) from rule 1 in the example of FIG. 8, in accordance with some embodiments.

In some embodiments, a task-based compartment policy implemented on a RTOS may have one or more of the following parts.

1) Initialize task code and data (label compartment with unique ID metadata)
2) Start RTOS scheduler (preserve ID through scheduler code)
3) Cooperative multitasking context switch (switch ID from Previous to Next compartment)
4) Preemptive multitasking context switch (switch ID from Previous to Next compartment)

In some embodiments, code may be shared between compartments, and may therefore not be labeled with a compartment ID at step 1). However, data belonging to the different compartments may be labeled with respective compartment IDs. In this manner, data isolation may be maintained even where code is shared between compartments.

In some embodiments, at startup, steps 1 & 2 may initialize the compartments and the task scheduler for the RTOS. For example, the illustrative compartment policy 800 shown in FIG. 8 may include the following "init" statement mapping an entity name, "application.code.function.portstartscheduler," to a metadata symbol, "Cpt A" (for compartment A).

require: init application.code.function.portstartscheduler
     {Cpt A}

In some embodiments, a policy compiler (e.g., the illustrative policy compiler 220 shown in FIG. 2) may generate a hierarchical metadata symbol (e.g., "Dover.Comparment.Cpt_A") based on the above "init" statement.

In some embodiments, a target description of the RTOS may include the following entity binding, which may bind the entity name, "application.code.function.portstartscheduler," to a function symbol, "xPortStartScheduler."

name: application.code.function.portstartscheduler
   elf name: xPortStartScheduler
   tag_all: true
   kind: symbol In some embodiments, a policy linker (e.g., the illustrative policy linker 225 shown in FIG. 2) may match the entity name in the "init" statement and the entity name in the entity binding, and may associate the hierarchical metadata symbol, "Dover.Comparment.Cpt_A," with a function referenced by the function symbol, "xPortStartScheduler."

In some embodiments, during normal operation, steps 3 & 4 may occur repeatedly as execution is transferred from one task to another. For instance, cooperative multitasking may happen synchronously when one task yields execution time to another, while preemptive multitasking may happen asynchronously, for example, via a timer interrupt and interrupt service routine (ISR) that pauses execution of one task to switch to another.

Below is illustrative pseudocode for the four steps in the above example. The annotations shown on each sub-step may show how a metadata ID is updated in that sub-step. The ID on the left of an arrow may be replaced by the ID on the right, where the labels may be as follows:

| Initialize compartment | |
| --- | --- |
| Allocate stack memory | |
| Assign compartment id | 0 <- N |
| Push stack ptr | N <- N |
| Initialize registers | 0 <- N |
| Set pc to task entry | 0 <- N |

| | |
|---|---|
| Set task parameters in reg | 0 <- N |
| return | |
| Start scheduler | |
| init scheduler data structures | |
| init timer | |
| Restore stack ptr from schedule data structure | P <- N |
| Restore pc to epc | P <- N |
| Restore registers | P <- N |
| Pop stack ptr | N <- N |
| Return from interrupt | |
| Cooperative multitasking context switch | |
| Disable interrupts | |
| Push stack ptr | P <- P |
| Save registers | P <- P |
| Save stack ptr in scheduler data structure | P <- P |
| Save return address as pc | P <- P |
| Call scheduler | |
| Restore stack ptr from schedule data structure | P <- N |
| Restore pc to epc | P <- N |
| Restore registers | P <- N |
| Pop stack ptr | N <- N |
| Return from interrupt | |
| Preemptive multitasking context switch | |
| Push stack ptr | P <- P |
| Save registers | P <- P |
| Save stack ptr in scheduler data structure | P <- P |
| Save epc as pc | P <- P |
| Call scheduler | |
| Restore stack ptr from schedule data structure | P <- N |
| Restore pc to epc | P <- N |
| Restore registers | P <- N |
| Pop stack ptr | N <- N |
| Return from interrupt | |

0 - Uninitialized ID
P - Previous ID
N - Next ID

Inter-Compartment Communication

In some embodiments, to facilitate communication between compartments, policy rules may be provided to allow compartment ID for data to change as the data is sent to another compartment. This may be done by extending the compartment ID, for example, by adding permissions associated with each ID. For instance, instead of "Cpt id," "Read id" or "Write id" may be used to indicate a permission associated with the ID.

In some embodiments, using permissions, certain memory buffers may be labeled readable by one compartment and writable by another. This may enable a natural programming style of independent processes communicating with streaming buffers (e.g., a Kahn process network).

FIG. 10 shows illustrative policy code 1000 with communication rules, in accordance with some embodiments.

Real Time Scheduling

In some embodiments, preemptive multitasking context switch (e.g., step 4 above) may happen during an asynchronous interrupt to a currently executing task. The inventors have recognized and appreciated that real time systems may be sensitive to interrupt latencies, and therefore it may be desirable that the preemptive multitasking context switch happen in a timely manner. Since the rules that allow P←P or P←N may not have been installed into a rule cache, a rule cache miss may occur during an ISR that implements the preemptive multitasking context switch. The possibility of a rule cache miss during an ISR may compromise one or more real time latency guarantees, which may affect correct functioning of an application. Accordingly, in some embodiments, a software mechanism may be provided for pre-installing rules in the cache, and/or a hardware mechanism may be provided for preventing the ISR rules from being evicted. This may preserve deterministic ISR performance.

Additionally, or alternatively, a hardware feature may be provided in a rule cache (e.g., the illustrative rule cache 144 in the example of FIG. 1) to allow a rule to forward one or more inputs of the rule to the rule's output. This forwarding feature may be implemented in any suitable manner, for example, by providing one or more designated tag values that, when presented in an output of a rule, cause the illustrative tag processing hardware 140 in the example of FIG. 1 to select one or more input tags to be used as one or more output tags, replacing the one or more designated tag values. The inventors have recognized and appreciated that one or more forwarding rules may be used to reduce space requirement for the rule cache 144. For instance, a forwarding rule may be used as a rule that is parameterized by one or more input tags. With reference to the P←P and P←N cases in the example above, a single rule may be used to handle every combination of tag values for P and N. In this manner, rules may be pre-installed without instantiating in advance all possible tag values for P and N.

Illustrative Computer

Figure 11:
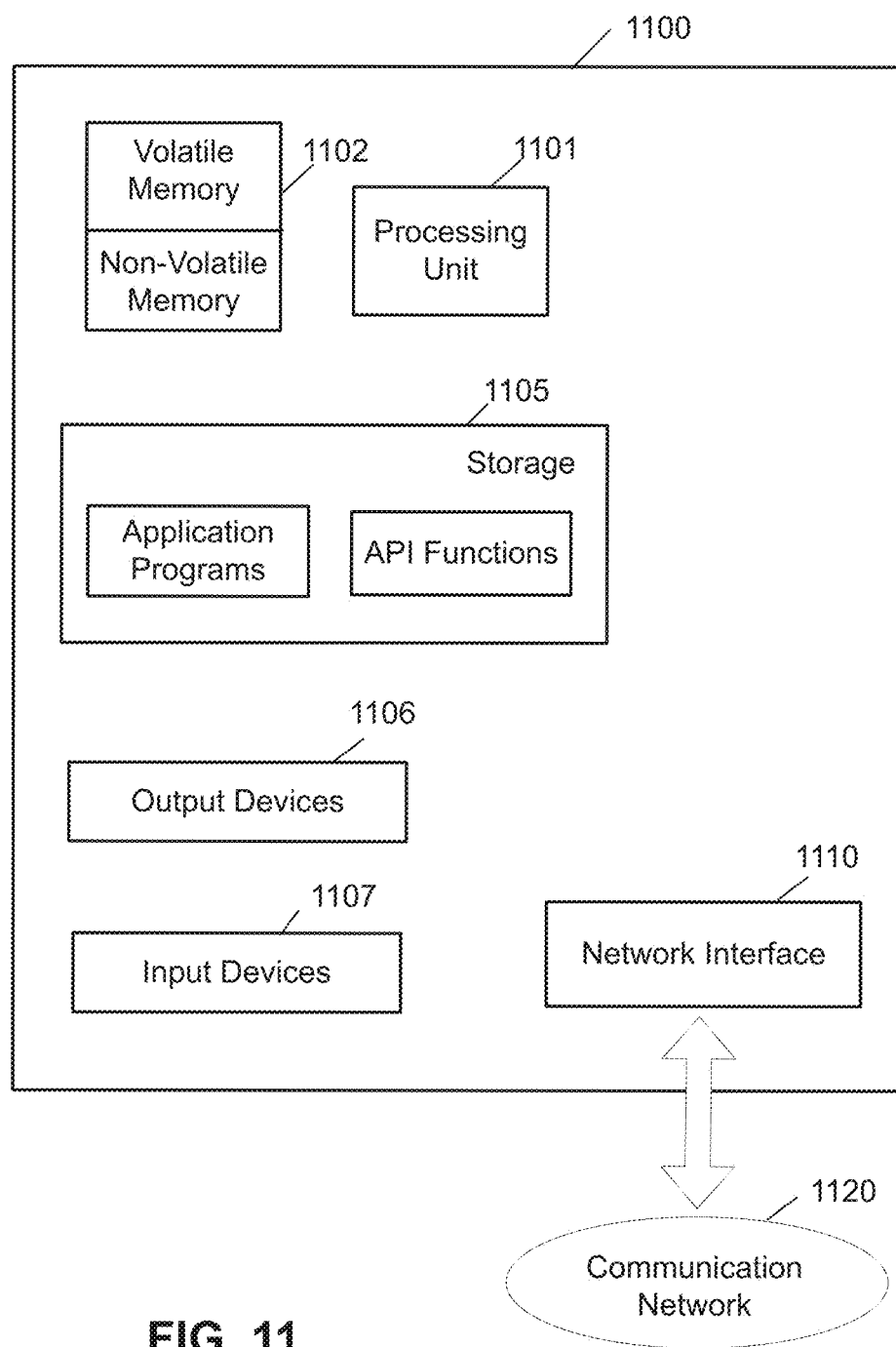
FIG. 11 shows, schematically, an illustrative computer 1100 on which any aspect of the present disclosure may be implemented.

FIG. 11 shows, schematically, an illustrative computer 1100 on which any aspect of the present disclosure may be implemented.

In the embodiment shown in FIG. 11, the computer 1100 includes a processing unit 1101 having one or more processors and a non-transitory computer-readable storage medium 1102 that may include, for example, volatile and/or non-volatile memory. The memory 1102 may store one or more instructions to program the processing unit 1101 to perform any of the functions described herein. The computer 1100 may also include other types of non-transitory computer-readable medium, such as storage 1105 (e.g., one or more disk drives) in addition to the system memory 1102. The storage 1105 may also store one or more application programs and/or resources used by application programs (e.g., software libraries), which may be loaded into the memory 1102.

The computer 1100 may have one or more input devices and/or output devices, such as devices 1106 and 1107 illustrated in FIG. 11. These devices may be used, for instance, to present a user interface. Examples of output devices that may be used to provide a user interface include printers and display screens for visual presentation of output, and speakers and other sound generating devices for audible presentation of output. Examples of input devices that may be used for a user interface include keyboards and pointing devices (e.g., mice, touch pads, and digitizing tablets). As another example, the input devices 1107 may include a microphone for capturing audio signals, and the output devices 1106 may include a display screen for visually rendering, and/or a speaker for audibly rendering, recognized text.

In the example shown in FIG. 11, the computer 1100 also includes one or more network interfaces (e.g., the network interface 1110) to enable communication via various networks (e.g., the network 1120). Examples of networks include a local area network (e.g., an enterprise network) and a wide area network (e.g., the Internet). Such networks may be based on any suitable technology and operate according to any suitable protocol, and may include wireless networks and/or wired networks (e.g., fiber optic networks).

Furthermore, the present technology can be embodied in the following configurations:

(1) A system comprising at least one processor programmed to:
  identify, based on a policy to be enforced, one or more metadata symbols corresponding to an entity name;
  identify, from a target description describing a target system, an entity description matching the entity name, wherein the entity description describes an entity of the target system; and
  apply a metadata label to the entity of the target system, wherein the metadata label is based on the one or more metadata symbols corresponding to the entity name, as identified based on the policy.

(2) The system of (1), wherein:
  the at least one processor is further programmed to construct the metadata label at least in part by including, in the metadata label, an indication that the one or more metadata symbols pertain to the policy.

(3) The system of any one of (1) through (2), wherein:
  the policy is to be enforced during execution of object code of one or more programs;
  the object code is in a loadable binary format; and
  the at least one processor is programmed to apply the metadata label to the entity at least in part by annotating at least one portion of the object code with a binary representation of the metadata label.

(4) The system of any one of (1) through (3), wherein:
  the at least one processor is further programmed to identify the at least one portion of the object code to be annotated, at least in part by:
    using the entity description to identify one or more object symbol names and one or more address ranges associated with the entity; and
    identifying, from the object code, based on the one or more address ranges, one or more instructions matching the one or more object symbol names; and
  annotating the at least one portion of the object code comprises annotating the one or more instructions identified from the object code with the binary representation of the metadata label.

(5) The system of any one of (1) through (4), wherein:
  the at least one processor is further programmed to generate an initialization specification based at least in part on the policy and the target description; and
  the at least one processor is programmed to apply the metadata label to the entity at least in part by including, in the initialization specification, an indication that the entity is associated with the metadata label.

(6) The system of (5), wherein:
  the at least one processor is further programmed to resolve at least one metadata symbol of the one or more metadata symbols into a binary representation; and
  the binary representation of the at least one metadata symbol is included in the initialization specification.

(7) The system of (5), wherein:
  the initialization specification is in a loadable binary format.

(8) The system of (1), wherein:
  the entity comprises a hardware entity;
  the entity description comprises a named property of the hardware entity; and
  the at least one processor is programmed to parse a hardware specification and generate the named property based on information extracted from the hardware specification.

(9) The system of (1), wherein:
  the entity comprises a software entity;
  the entity description comprises a named property of the software entity; and
  the at least one processor is programmed to generate the named property based on analysis of source code and/or object code of the software entity.

(10) A system comprising at least one processor programmed to:
  in response to a piece of object code being loaded to a location in an application memory, identify, based on an initialization specification, at least one metadata label associated with the piece of object code; and
  associate the location in the application memory, where the piece of object code is loaded, with the at least one metadata label.

(11) The system of (10), wherein the piece of object code comprises one or more executable instructions.

(12) The system of (10), wherein the piece of object code comprises data to be manipulated by one or more executable instructions.

(13) The system of any one of (11) through (13), wherein:
  the at least one processor is programmed to associate the location in the application memory with the at least one metadata label at least in part by creating an entry in a tag map table, the entry mapping the location in the application memory to the at least one metadata label.

(14) The system of (13), wherein:
  the entry in the tag map table stores a binary representation of the at least one metadata label.

(15) The system of (13), wherein:
  the entry in the tag map table stores information indicative of a location at which a binary representation of the at least one metadata label is stored.

(16) The system of (15), wherein:
  the information comprises an address in a metadata memory at which the binary representation of the at least one metadata label is stored.

(17) The system of (16), wherein:
  the metadata memory is physically separate from the application memory.

(18) The system of (16), wherein the information comprises an identifier for a register at which the binary representation of the at least one metadata label is stored.

(19) The system of (15), wherein:
  the location in the application memory where the piece of object code is loaded is at a first address;
  the location at which the binary representation of the at least one metadata label is stored is at a second address; and
  the entry in the tag map table maps the first address to the second address via an address translation.

(20) The system of any one of (11) through (14), further comprising policy enforcement hardware, wherein:
  the at least one processor is programmed to associate the location in the application memory with the at least one metadata label at least in part by causing the policy enforcement hardware to evaluate one or more rules;

evaluation of the one or more rules comprises looking up the tag map table for an entry corresponding to the location in the application memory; and the policy enforcement hardware is configured to, in response to determining that the tag map table does not already include an entry corresponding to the location in the application memory, create the entry in the tag map table mapping the location in the application memory to the at least one metadata label.

(21) The system of (10), wherein:

the at least one processor is further programmed to resolve the at least one metadata label into at least one binary representation; and associating the location in the application memory with the at least one metadata label comprises associating the location in the application memory with the at least one binary representation of the at least one metadata label.

(22) The system of (21), wherein:

the piece of object code comprises object code of a user application that is loaded dynamically; and the at least one processor is programmed to:
dynamically resolve the at least one metadata label into the at least one binary representation; and
dynamically associate the location in the application memory with the at least one binary representation of the at least one metadata label.

(23) The system of (11), wherein:

the at least one processor is further programmed to confirm that the initialization specification is from a trusted source, at least in part by verifying a cryptographic signature on the initialization specification; and the at least one processor is programmed to associate the location in the application memory with the at least one metadata label only in response to confirming that the initialization specification is from a trusted source.

(24) The system of (11), wherein:

the at least one metadata label comprises a first metadata label;

the at least one processor is further programmed to:
confirm that the piece of object code is from a trusted source, at least in part by verifying a cryptographic signature on the piece of object code; and
associate the piece of object code with a second metadata label indicating that the piece of object code is from a trusted source.

(25) The system of (11), further comprising policy enforcement hardware, wherein:

the at least one metadata label comprises a default metadata label;

the at least one processor is further programmed to cause the policy enforcement hardware to evaluate one or more rules; and evaluation of the one or more rules causes the policy enforcement hardware to replace the default metadata label with another metadata label.

(26) A system comprising at least one processor programmed to:

identify metadata associated with an entity in a target system, wherein the metadata comprises a binary representation of a metadata label;

use stored information to map the binary representation to a different representation of the metadata label; and display the metadata label in a human readable form, in a manner that indicates the metadata label is associated with the entity in the target system.

(27) The system of (26), wherein:

the at least one processor is further programmed to resolve metadata labels into respective binary representations; and the stored information comprises a mapping from the binary representations back to the metadata labels.

(28) The system of (26), wherein:

the at least one processor is further programmed to display, in human readable form, an initialization specification mapping a plurality of entities of the target system to respective sets of one or more metadata labels.

(29) The system of (26), wherein the at least one processor is further programmed to:

receive a request from a user to examine a policy violation; and in response to the request, determine that the entity of the target system is related to the policy violation.

(30). A method performed by the system of any of the preceding configurations.

(31) At least one computer-readable medium having encoded thereon instructions which, when executed by at least one processor, cause the at least one processor to perform the method of (30)

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing descriptions and drawings are by way of example only.

The above-described embodiments of the present disclosure can be implemented in any of numerous ways. For example, the embodiments may be implemented using hardware, software, or a combination thereof. When implemented in software, the software code may be executed on any suitable processor or collection of processors, whether provided in a single computer, or distributed among multiple computers.

Also, the various methods or processes outlined herein may be coded as software that is executable on one or more processors running any one of a variety of operating systems or platforms. Such software may be written using any of a number of suitable programming languages and/or programming tools, including scripting languages and/or scripting tools. In some instances, such software may be compiled as executable machine language code or intermediate code that is executed on a framework or virtual machine. Additionally, or alternatively, such software may be interpreted.

The techniques disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more processors, perform methods that implement the various embodiments of the present disclosure discussed above. The computer-readable medium or media may be transportable, such that the program or programs stored thereon may be loaded onto one or more different computers or other processors to implement various aspects of the present disclosure as discussed above.

The terms "program" or "software" are used herein to refer to any type of computer code or set of computer-executable instructions that may be employed to program one or more processors to implement various aspects of the present disclosure as discussed above. Moreover, it should be appreciated that according to one aspect of this embodiment, one or more computer programs that, when executed, perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Program modules may include routines, programs, objects, components, data structures, etc. that perform particular tasks or implement particular abstract data types. Functionalities of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields to locations in a computer-readable medium that convey relationship between the fields. However, any suitable mechanism may be used to establish a relationship between information in fields of a data structure, including through the use of pointers, tags, or other mechanisms that establish relationship between data elements.

Various features and aspects of the present disclosure may be used alone, in any combination of two or more, or in a variety of arrangements not specifically discussed in the embodiments described in the foregoing, and are therefore not limited to the details and arrangement of components set forth in the foregoing description or illustrated in the drawings. For example, aspects described in one embodiment may be combined in any manner with aspects described in other embodiments.

Also, the techniques disclosed herein may be embodied as methods, of which examples have been provided. The acts performed as part of a method may be ordered in any suitable way. Accordingly, embodiments may be constructed in which acts are performed in an order different from illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A system comprising:
    at least one hardware processor programmed to:
        identify, based on a policy to be enforced, one or more metadata symbols corresponding to an entity name;
        identify, from a target description describing a target system, an entity description matching the entity name, wherein the entity description describes an entity of the target system; and
        apply a metadata label to the entity of the target system, wherein:
            the metadata label is based on the one or more metadata symbols corresponding to the entity name, as identified based on the policy;
            the at least one hardware processor is further programmed to generate an initialization specification based at least in part on the policy and the target description;
            the at least one hardware processor is programmed to apply the metadata label to the entity at least in part by including, in the initialization specification, an indication that the entity is associated with the metadata label;
            the at least one hardware processor is further programmed to resolve the metadata label, which is based on the one or more metadata symbols, into a binary representation; and
            the binary representation of the metadata label is included in the initialization specification.

2. The system of claim 1, wherein:
    the policy is to be enforced during execution of object code of one or more programs;
    the object code is output by a compiler toolchain in a loadable binary format; and
    the at least one hardware processor is programmed to apply the metadata label to the entity at least in part by, prior to execution of the object code, annotating at least one portion of the object code with the binary representation of the metadata label.

3. The system of claim 2, wherein:
    the at least one hardware processor is further programmed to identify the at least one portion of the object code to be annotated, at least in part by:
        using the entity description to identify one or more object symbol names and one or more address ranges associated with the entity; and
        identifying, from the object code, based on the one or more address ranges, one or more instructions matching the one or more object symbol names; and
        annotating the at least one portion of the object code comprises annotating the one or more instructions identified from the object code with the binary representation of the metadata label.

4. The system of claim 1, wherein the at least one hardware processor is further programmed to:
    in response to a piece of object code being loaded to a location in an application memory, identify, based on the initialization specification, at least one metadata label associated with the piece of object code, wherein the piece of object code comprises one or more executable instructions and/or data to be manipulated by one or more executable instructions; and
    associate the location in the application memory, where the piece of object code is loaded, with the at least one metadata label.

5. The system of claim 4, wherein:
    the at least one hardware processor is programmed to associate the location in the application memory with the at least one metadata label at least in part by creating an entry in a tag map table, the entry mapping the location in the application memory to the at least one metadata label, wherein:

the entry in the tag map table stores a binary representation of the at least one metadata label and/or information indicative of a location at which a binary representation of the at least one metadata label is stored.

6. The system of claim 5, wherein:
the information comprises:
an address in a metadata memory at which the binary representation of the at least one metadata label is stored, and/or
an identifier for a register at which the binary representation of the at least one metadata label is stored.

7. The system of claim 5, further comprising policy enforcement hardware, wherein:
the at least one hardware processor is programmed to associate the location in the application memory with the at least one metadata label at least in part by causing the policy enforcement hardware to evaluate one or more rules;
evaluation of the one or more rules comprises looking up the tag map table for an entry corresponding to the location in the application memory; and
the policy enforcement hardware is configured to, in response to determining that the tag map table does not already include an entry corresponding to the location in the application memory, create the entry in the tag map table mapping the location in the application memory to the at least one metadata label.

8. The system of claim 4, wherein:
the at least one hardware processor is further programmed to resolve the at least one metadata label into at least one binary representation; and
associating the location in the application memory with the at least one metadata label comprises associating the location in the application memory with the at least one binary representation of the at least one metadata label.

9. The system of claim 8, wherein:
the piece of object code comprises object code of a user application that is loaded dynamically; and
the at least one hardware processor is programmed to:
dynamically resolve the at least one metadata label into the at least one binary representation; and
dynamically associate the location in the application memory with the at least one binary representation of the at least one metadata label.

10. The system of claim 4, wherein:
the initialization specification is in a loadable binary format;
the at least one hardware processor is further programmed to confirm that the initialization specification is from a trusted source, at least in part by verifying a cryptographic signature on the initialization specification; and
the at least one hardware processor is programmed to associate the location in the application memory with the at least one metadata label only in response to confirming that the initialization specification is from a trusted source.

11. The system of claim 4, further comprising policy enforcement hardware, wherein:
the at least one metadata label comprises a default metadata label;
the at least one hardware processor is further programmed to cause the policy enforcement hardware to evaluate one or more rules; and
evaluation of the one or more rules causes the policy enforcement hardware to replace the default metadata label with another metadata label.

12. A method performed by a system comprising at least one processor, the method comprising acts of:
identifying, based on a policy to be enforced, one or more metadata symbols corresponding to an entity name;
identifying, from a target description describing a target system, an entity description matching the entity name, wherein the entity description describes an entity of the target system; and
applying a metadata label to the entity of the target system, wherein:
the metadata label is based on the one or more metadata symbols corresponding to the entity name, as identified based on the policy;
the method further comprises an act of generating an initialization specification based at least in part on the policy and the target description;
applying the metadata label to the entity comprises including, in the initialization specification, an indication that the entity is associated with the metadata label;
the method further comprises an act of resolving the metadata label, which is based on the one or more metadata symbols, into a binary representation; and
the binary representation of the metadata label is included in the initialization specification.

13. The method of claim 12, wherein:
the policy is to be enforced during execution of object code of one or more programs;
the object code is output by a compiler toolchain in a loadable binary format; and
applying the metadata label to the entity comprises, prior to execution of the object code, annotating at least one portion of the object code with the binary representation of the metadata label.

14. The method of claim 13, further comprising an act of:
identifying the at least one portion of the object code to be annotated, at least in part by:
using the entity description to identify one or more object symbol names and one or more address ranges associated with the entity; and
identifying, from the object code, based on the one or more address ranges, one or more instructions matching the one or more object symbol names; and
annotating the at least one portion of the object code comprises annotating the one or more instructions identified from the object code with the binary representation of the metadata label.

15. The method of claim 12, further comprising acts of:
in response to a piece of object code being loaded to a location in an application memory, identifying, based on the initialization specification, at least one metadata label associated with the piece of object code, wherein the piece of object code comprises one or more executable instructions and/or data to be manipulated by one or more executable instructions; and
associating the location in the application memory, where the piece of object code is loaded, with the at least one metadata label.

16. The method of claim 15, wherein:
associating the location in the application memory with the at least one metadata label comprises creating an entry in a tag map table, the entry mapping the location in the application memory to the at least one metadata label, wherein:

the entry in the tag map table stores a binary representation of the at least one metadata label and/or information indicative of a location at which a binary representation of the at least one metadata label is stored.

17. The method of claim 16, wherein:
the information comprises:
an address in a metadata memory at which the binary representation of the at least one metadata label is stored, and/or
an identifier for a register at which the binary representation of the at least one metadata label is stored.

18. The method of claim 16, wherein:
the system further comprises policy enforcement hardware;
associating the location in the application memory with the at least one metadata label comprises causing the policy enforcement hardware to evaluate one or more rules;
evaluation of the one or more rules comprises looking up the tag map table for an entry corresponding to the location in the application memory; and
in response to determining that the tag map table does not already include an entry corresponding to the location in the application memory, creating, by the policy enforcement hardware, the entry in the tag map table mapping the location in the application memory to the at least one metadata label.

19. The method of claim 15, further comprising an act of:
resolving the at least one metadata label into at least one binary representation, wherein associating the location in the application memory with the at least one metadata label comprises associating the location in the application memory with the at least one binary representation of the at least one metadata label.

20. The method of claim 19, wherein:
the piece of object code comprises object code of a user application that is loaded dynamically;
the at least one metadata label is dynamically resolved into the at least one binary representation; and
the location in the application memory is dynamically associated with the at least one binary representation of the at least one metadata label.

21. The method of claim 15, wherein:
the initialization specification is in a loadable binary format;
the method further comprises an act of confirming that the initialization specification is from a trusted source, at least in part by verifying a cryptographic signature on the initialization specification; and
the location in the application memory is associated with the at least one metadata label only in response to confirming that the initialization specification is from a trusted source.

22. The method of claim 15, wherein:
the system further comprises policy enforcement hardware;
the at least one metadata label comprises a default metadata label;
the method further comprises an act of causing the policy enforcement hardware to evaluate one or more rules; and
evaluation of the one or more rules causes the policy enforcement hardware to replace the default metadata label with another metadata label.

23. At least one non-transitory computer-readable medium having encoded thereon instructions which, when executed by at least one processor, cause the at least one processor to:
identify, based on a policy to be enforced, one or more metadata symbols corresponding to an entity name;
identify, from a target description describing a target system, an entity description matching the entity name, wherein the entity description describes an entity of the target system; and
apply a metadata label to the entity of the target system, wherein:
the metadata label is based on the one or more metadata symbols corresponding to the entity name, as identified based on the policy;
the at least one processor is further programmed by the instructions to generate an initialization specification based at least in part on the policy and the target description;
the at least one processor is programmed by the instructions to apply the metadata label to the entity at least in part by including, in the initialization specification, an indication that the entity is associated with the metadata label;
the at least one processor is further programmed by the instructions to resolve the metadata label, which is based on the one or more metadata symbols, into a binary representation; and
the binary representation of the metadata label is included in the initialization specification.

* * * * *